US011012558B2

(12) United States Patent
Pulitzer

(10) Patent No.: US 11,012,558 B2
(45) Date of Patent: *May 18, 2021

(54) SYSTEM AND METHOD FOR USING A MOBILE DEVICE AS AN INPUT DEVICE FOR SURVEYS AT A LIVE EVENT

(71) Applicant: Tesla Laboratories, LLC, Jackson, WY (US)

(72) Inventor: Jovan Hutton Pulitzer, Frisco, TX (US)

(73) Assignee: TESLA LABORATORIES, LLC, Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,389

(22) Filed: Jan. 22, 2020

(65) Prior Publication Data

US 2020/0162609 A1 May 21, 2020

Related U.S. Application Data

(63) Continuation of application No. 16/186,284, filed on Nov. 9, 2018, now Pat. No. 10,547,742, which is a (Continued)

(51) Int. Cl.
*G06Q 10/02* (2012.01)
*H04W 4/33* (2018.01)
(Continued)

(52) U.S. Cl.
CPC .... *H04M 3/42357* (2013.01); *G06F 16/9554* (2019.01); *G06Q 10/02* (2013.01);
(Continued)

(58) Field of Classification Search
CPC ...................................................... G06Q 10/02
See application file for complete search history.

(56) References Cited

U.S. PATENT DOCUMENTS 8,417,221 B2 4/2013 Shaw
9,646,382 B2 5/2017 Hawkins
(Continued)

OTHER PUBLICATIONS

Anonymous: "Does an app exist to auto-launch an app when . . . | Android Development and Hacking", Jun. 5, 2017 (Jun. 5, 2017), pp. 1-4, XP055652647, Retrieved from the Internet: URL: https://forum.xda-developers.com/showthread.php?t=1602650 [retrieved on Dec. 13, 2019].

(Continued)

*Primary Examiner* — Christle I Marshall

(57) ABSTRACT

A method is provided for interacting with audience members in an event, each of the potential attendees having available thereto a unique identifier. The method comprises creating, for an attendee, a unique ID (UID) on a mobile wireless device (MWD) by the steps of inputting to the MWD one of the unique identifiers, combining the obtained unique identifier with a UID time stamp at the time of creation of the UID; receiving with a server on a first wireless channel communications from the MWD; registering the UID at the physical location of the event; generating a visual query; displaying on the MWD response indicators; receiving at the server from the registered attendee a response, to the query over the first wireless channel; and storing in a database on the server the received response in association with the displayed query.

20 Claims, 25 Drawing Sheets

Related U.S. Application Data continuation of application No. 15/360,697, filed on Nov. 23, 2016, now abandoned, which is a continuation-in-part of application No. 15/146,464, filed on May 4, 2016, now Pat. No. 9,959,689.

(60) Provisional application No. 62/258,982, filed on Nov. 23, 2015, provisional application No. 62/258,983, filed on Nov. 23, 2015, provisional application No. 62/258,985, filed on Nov. 23, 2015, provisional application No. 62/258,987, filed on Nov. 23, 2015, provisional application No. 62/258,988, filed on Nov. 23, 2015, provisional application No. 62/258,989, filed on Nov. 23, 2015, provisional application No. 62/258,990, filed on Nov. 23, 2015, provisional application No. 62/258,994, filed on Nov. 23, 2015, provisional application No. 62/258,996, filed on Nov. 23, 2015, provisional application No. 62/258,997, filed on Nov. 23, 2015.

(51) Int. Cl.
*H04M 3/42* (2006.01)
*H04L 29/08* (2006.01)
*H04W 4/021* (2018.01)
*G06Q 30/02* (2012.01)
*G07C 9/21* (2020.01)
*G06F 16/955* (2019.01)
*H04W 60/00* (2009.01)

(52) U.S. Cl.
CPC ..... *G06Q 30/0201* (2013.01); *G06Q 30/0241* (2013.01); *G07C 9/21* (2020.01); *H04L 67/306* (2013.01); *H04W 4/021* (2013.01); *H04W 4/33* (2018.02); *H04W 60/00* (2013.01)

(56) References Cited

U.S. PATENT DOCUMENTS

| | | |
|---|---|---|
| 10,547,742 B2 * | 1/2020 | Pulitzer ............... G06F 16/9554 |
| 2004/0158865 A1 | 8/2004 | Kubler et al. |
| 2007/0294096 A1 | 12/2007 | Randall et al. |
| 2009/0271740 A1 | 10/2009 | Ryan-Hutton et al. |
| 2010/0306064 A1 | 12/2010 | Inselburg |
| 2011/0271295 A1 | 11/2011 | Redmann et al. |
| 2012/0221962 A1 | 8/2012 | Lew et al. |
| 2013/0116044 A1 | 5/2013 | Schwartz |
| 2013/0157693 A1 | 6/2013 | Mercuri et al. |
| 2015/0281878 A1 | 10/2015 | Roundtree et al. |
| 2016/0110467 A1 | 4/2016 | Hern |
| 2016/0156638 A1 | 6/2016 | Somani et al. |
| 2016/0335564 A1 | 11/2016 | Downy et al. |
| 2017/0155761 A1 * | 6/2017 | Pulitzer ................ H04L 67/306 |
| 2017/0280298 A1 | 9/2017 | Mycek et al. |
| 2019/0082049 A1 * | 3/2019 | Pulitzer ............ H04M 3/42357 |

OTHER PUBLICATIONS

Anonymous: "NFC Basics I Android Developers", Feb. 19, 2014 (Feb. 19, 2014), XP055332687, Retrieved from the Internet: URL: http://web.archive.org/web/20140219150611/http://developer.android.com/guide/topics/connectivity/nfc/nfc.html [retrieved on Jan. 5, 2017].
EP: Article 94(3) Communication of 16869004.8 (related case); dated Jan. 2, 2020; 8 pages.

* cited by examiner

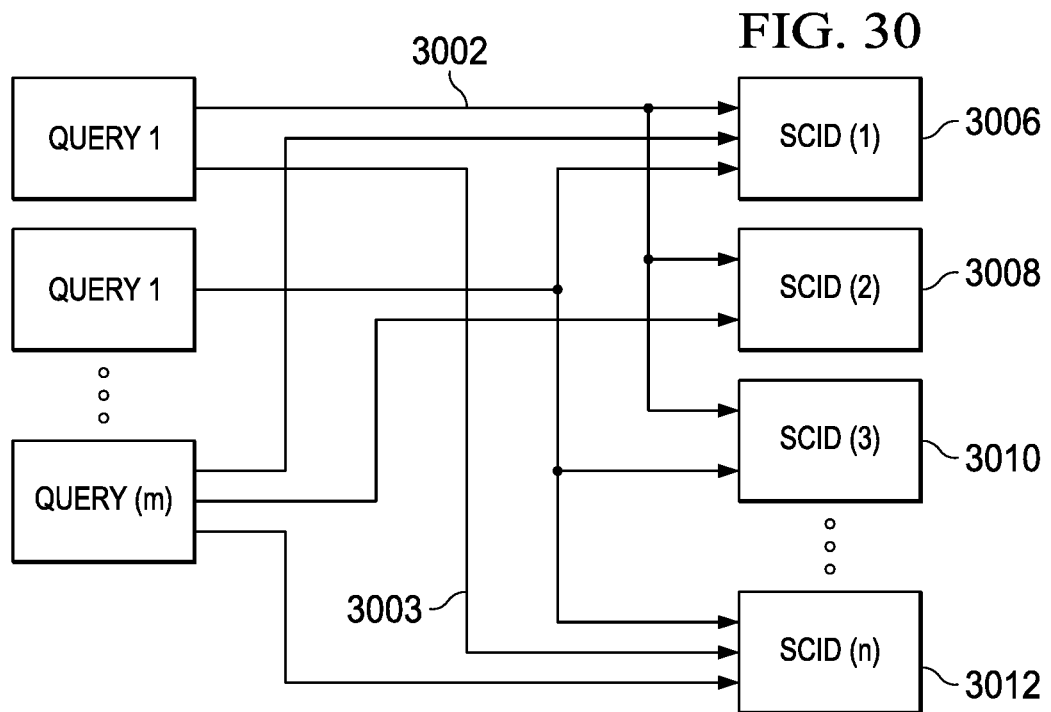
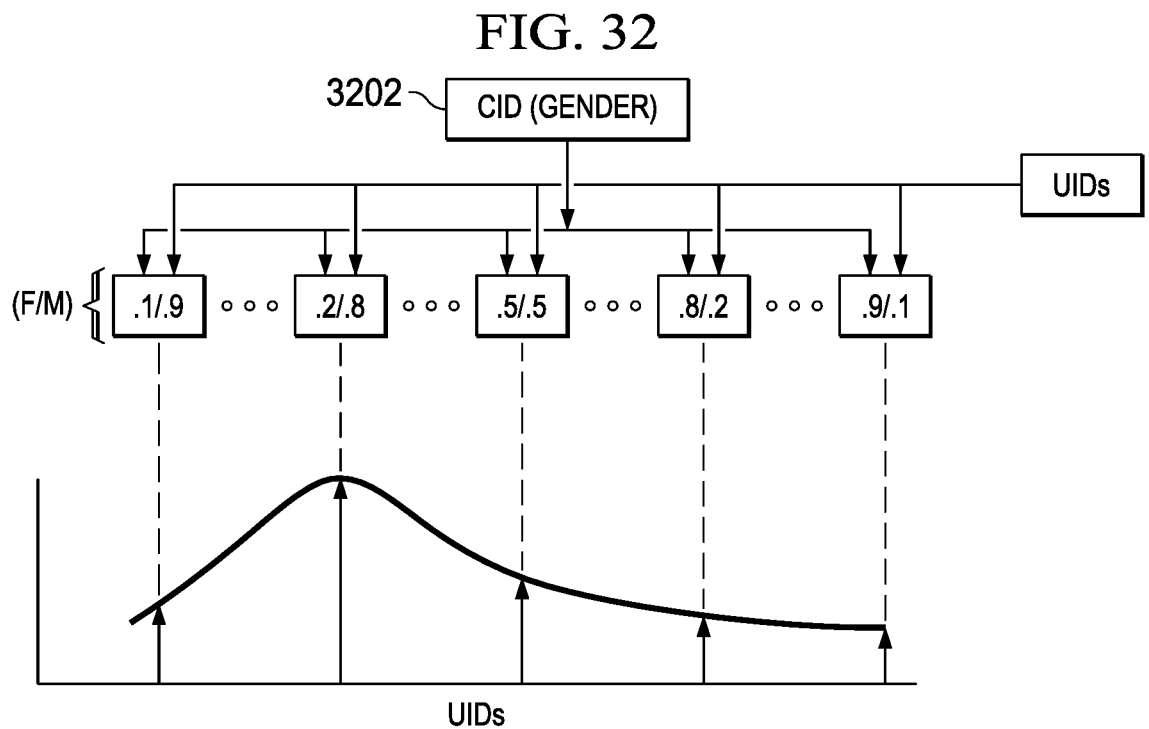

SYSTEM AND METHOD FOR USING A MOBILE DEVICE AS AN INPUT DEVICE FOR SURVEYS AT A LIVE EVENT

CROSS-REFERENCE TO RELATED APPLICATIONS

This application is a Continuation of U.S. patent application Ser. No. 16/186,284, filed Nov. 9, 2018, entitled SYSTEM AND METHOD FOR USING A MOBILE DEVICE AS AN INPUT DEVICE FOR SURVEYS AT A LIVE EVENT. U.S. patent application Ser. No. 16/186,284 is a Continuation of U.S. patent application Ser. No. 15/360,697, filed on Nov. 23, 2016, entitled SYSTEM AND METHOD FOR USING A MOBILE DEVICE AS AN INPUT DEVICE FOR SURVEYS AT A LIVE EVENT. U.S. application Ser. No. 15/360,697 is a Continuation-in-Part of U.S. patent application Ser. No. 15/146,464, filed on May 4, 2016, entitled SYSTEM AND METHOD FOR CREATION OF UNIQUE IDENTIFICATION FOR USE IN GATHERING SURVEY DATA FROM A MOBILE DEVICE AT A LIVE EVENT, issued as U.S. Pat. No. 9,959,689 on May 1, 2018, which claims the benefit of U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, which is incorporated by reference herein in its entirety. U.S. patent application Ser. No. 15/146,464 also claims the benefit of U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT, which is incorporated by reference herein in its entirety. U.S. patent application Ser. No. 15/146,464 also claims the benefit of U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, which is incorporated by reference herein in its entirety. U.S. patent application Ser. No. 15/146,464 also claims the benefit of U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, which is incorporated by reference herein in its entirety. U.S. patent application Ser. No. 15/146,464 also claims the benefit of U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, which is incorporated by reference herein in its entirety. U.S. patent application Ser. Nos. 16/186,284, 15/360,697 and 15/146,464 are incorporated by reference herein in their entirety.

This application also claims the benefit of U.S. Provisional Application No. 62/258,994, filed on Nov. 23, 2015, entitled SYSTEM AND METHOD FOR PROVIDING MOBILE DEVICE SURVEY INTERFACE BASED ON VISUAL INDICIA, U.S. Provisional Application No. 62/258,996, filed on Nov. 23, 2015, entitled SYSTEM AND METHOD FOR GENERATING A DIGITAL IMAGE BASED ON INPUT FROM MOBILE DEVICE TO ALLOW CROWD TO CONTROL VISUAL RESULTS OF RESPONSE, U.S. Provisional Application No. 62/258,989, filed on Nov. 23, 2015, entitled SYSTEM AND METHOD FOR SOCIAL MEASUREMENT OF INDIVIDUALS BASED ON DATA COLLECTED FROM MOBILE DEVICE, U.S. Provisional Application No. 62/258,997, filed on Nov. 23, 2015, entitled SYSTEM AND METHOD FOR CONDUCTING A CONTEST BASED ON INPUT FROM MOBILE DEVICE IN A CROWD-BASED RESPONSE SYSTEM, and U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT. This application also claims the benefit of U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, and U.S. Provisional Application No. 62/258,990, filed on Nov. 23, 2015, entitled SYSTEM AND METHOD FOR EXTRAPOLATING STATISTICAL DATA GENERATED FROM A MOBILE DEVICE AT A LIVE EVENT FOR DETERMINING MERCHANTABILITY. U.S. Provisional Application No. 62/258,994 is incorporated by reference herein in its entirety. U.S. Provisional Application No. 62/258,996 is incorporated by reference herein in its entirety. U.S. Provisional Application No. 62/258,989 is incorporated by reference herein in its entirety. U.S. Provisional Application No. 62/258,997 is incorporated by reference herein in its entirety. U.S. Provisional Application No. 62/258,982 is incorporated by reference herein in its entirety. U.S. Provisional Application No. 62/258,983 is incorporated by reference herein in its entirety. U.S. Provisional Application No. 62/258,985 is incorporated by reference herein in its entirety. U.S. Provisional Application No. 62/258,987 is incorporated by reference herein in its entirety. U.S. Provisional Application No. 62/258,988 is incorporated by reference herein in its entirety. U.S. Provisional Application No. 62/258,990 is incorporated by reference herein in its entirety.

TECHNICAL FIELD

The following disclosure relates to generally to the interface between advertisers, media companies, leagues, sponsors, underwriters, partners and media partners, leagues, teams, franchises, sponsors, underwriters, media partners, conferences, venue specific messengers, and championships, as well as a target audience, and collecting statistics relating thereto.

BACKGROUND

When advertisers, media companies, leagues, sponsors, underwriters, partners and media partners, leagues, teams, franchises, sponsors, underwriters, media partners, conferences, venue specific messengers, and championships ("the messenger") distribute their advertising with respect to a particular venue, it is important that they have some type of feedback as to the effectiveness of these advertisements. The main problem that exists today in certain venues is that the advertisement is displayed on a screen at, for example, a football game, and it is expected that a certain portion of the attendees are viewing the screen. However, some attendees may have left their seats and gone for refreshments or they may actually, in the current environment, the occupied with their mobile devices. As such, it is difficult for an advertiser to have any feedback as to the "effectiveness" of a particular advertisement at reaching the eyes of the attendees.

BRIEF DESCRIPTION OF THE DRAWINGS

For a more complete understanding, reference is now made to the following description taken in conjunction with the accompanying Drawings in which:

FIG. 30 illustrates a diagrammatic view of the mapping of queries to SCIDs;

FIG. 32 illustrates a diagrammatic view of one particular statistical spread over multiple queries presented throughout an event at a live performance within a given venue;

DETAILED DESCRIPTION

Figure 1:
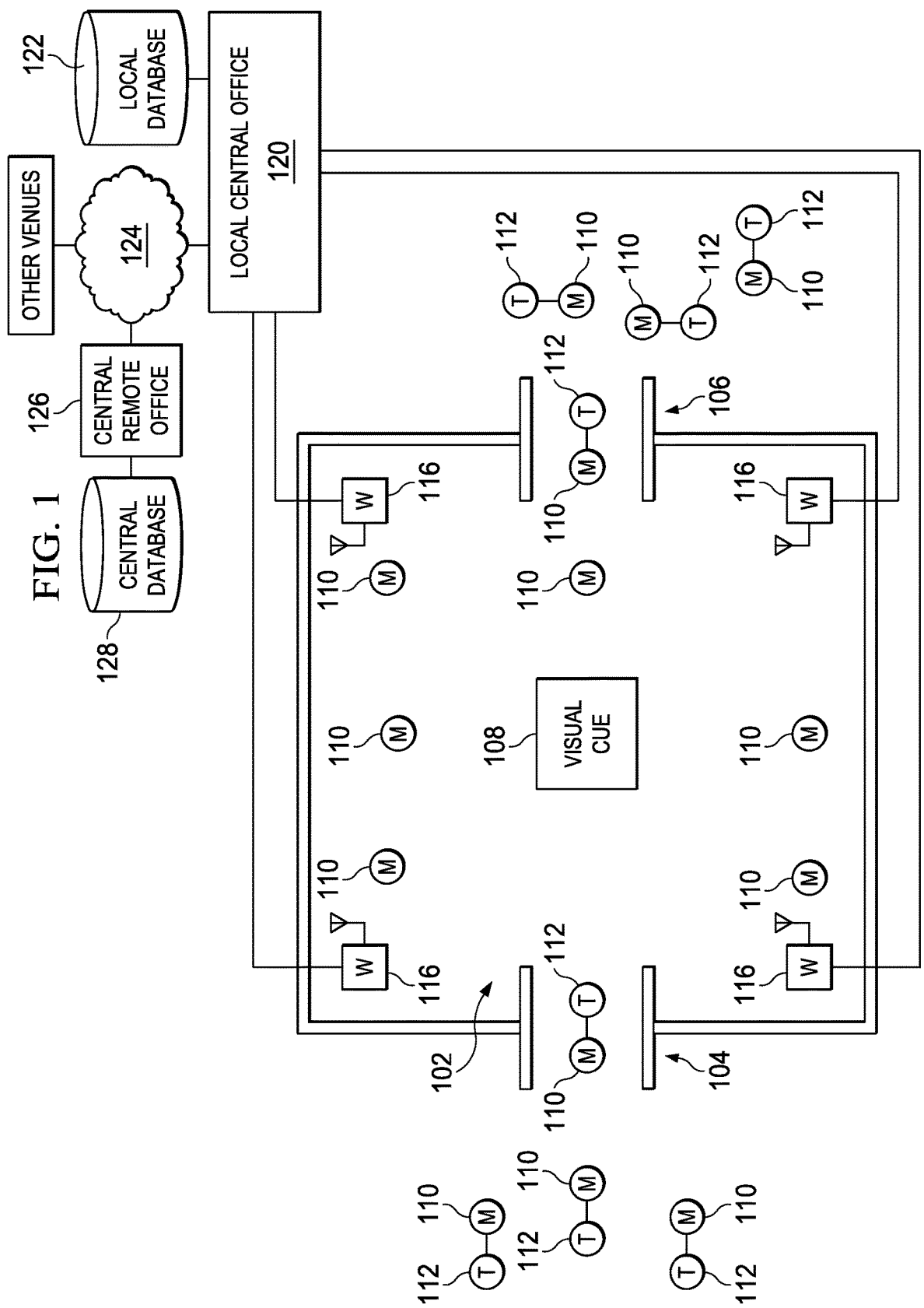
FIG. 1 illustrates an overall diagrammatic view of a venue utilizing a disclosed embodiment.

Referring now to FIG. 1, there is illustrated a diagrammatic view of the overall operation at a particular venue utilizing the disclosed embodiment. In this illustration, there is illustrated a single venue 102, such as a football stadium, a concert hall, or anything that requires a ticket to grant entrance thereto and also provide some type of seating chart such that each ticket holder has a defined seat associated therewith or assigned thereto. This venue 102 has provided therefore, by example, two gates 104 and 106. In the center of the venue 102 or disposed throughout the venue 102 there is provided some type of visual/audio interfaced 108. Throughout the following description, this will typically be referred to as a visual interface providing a visual cue of some sort. However, it should be understood that the cue is some type of information that can be transmitted from one or more locations within the venue 102 in the form of a video or an audio cue or some type of cue that can be sensed by an attendee. Although this visual cue 108 is illustrated as being in the center of the venue 102, it should be understood that it can be located at different locations throughout the venue 102. Additionally, the visual cue from multiple locations could all be the same cue, or it could actually be different cues.

There are illustrated a plurality of Mobile Units 110 labeled "M" which will be referred to hereinafter by the terminology "MU" 110. Each of these MUs 110 is associated with an individual, and that individual has associated therewith a ticket, this ticket referred to by a reference numeral 112. The only MUs that are illustrated as having a ticket 112 associated therewith are those that are entering the gate 104 or the gate 106. Each of these MUs 110 has the ability to communicate via a wireless link to one of the plurality of wireless network receivers 116 disposed throughout the venue 102. These wireless network receivers provide substantially full coverage around the venue 102, and each of the wires receivers 116 are connected directly to a local central office 120 (CO) which basically has a computer that is interfaced with a local database 122. This database 122 and local central office 120 are connected through a global network 124 (Internet) to a central remote office 126, which has associated therewith a central database 126.

The wireless receivers can be any type of wireless receiver network, for example, a Wi-Fi-based network. However, it should be understood that any other type of network could be utilized. Each of these wireless receivers 116 has associated therewith a unique ID in the form of an SSID that can be recognized by the MU 110 and, once a communication link is effected between the MU 110 and the wireless receiver 116, a physical location can be established with respect to the physical location of the venue 102. Since the local central office 120 is aware of its location and it is connected directly to the wireless receivers 116, the location of the venue 102 can be associated with any data in the local database 122. This allows any data associated with the local database 122 to also be associated with any information collected from attendees at the event occurring in the venue 102.

Additionally, the wireless interface between each of the MUs 110 and the local central office 120 could be effected with a mesh network. The communication protocol could use a Zigbee network, a Thread network, or any type of network that allows data to actually be transmitted to a master station to be transferred from one MU 110 to another MU 110.

In the overall operation, as will be described hereinbelow, a particular user will enter the venue 102 and initiate an application on their associated MU 110 which will create a unique ID (UID) associated with that particular device at that particular time based upon information contained on their individual ticket which will also identify the seat to which they are assigned. The user will then provide a response of some sort to possibly a visual cue received locally and send the UID and response to the local CO 120. This will result in a registration of that particular device with the local CO 120. Thereafter, visual cues are displayed on the display 108 with choices. These choices are associated with preset choice buttons on the MU 110 that, when selected, provide responses that are utilized by the local CO 120 for collecting statistics on the attendees.

Figure 2:
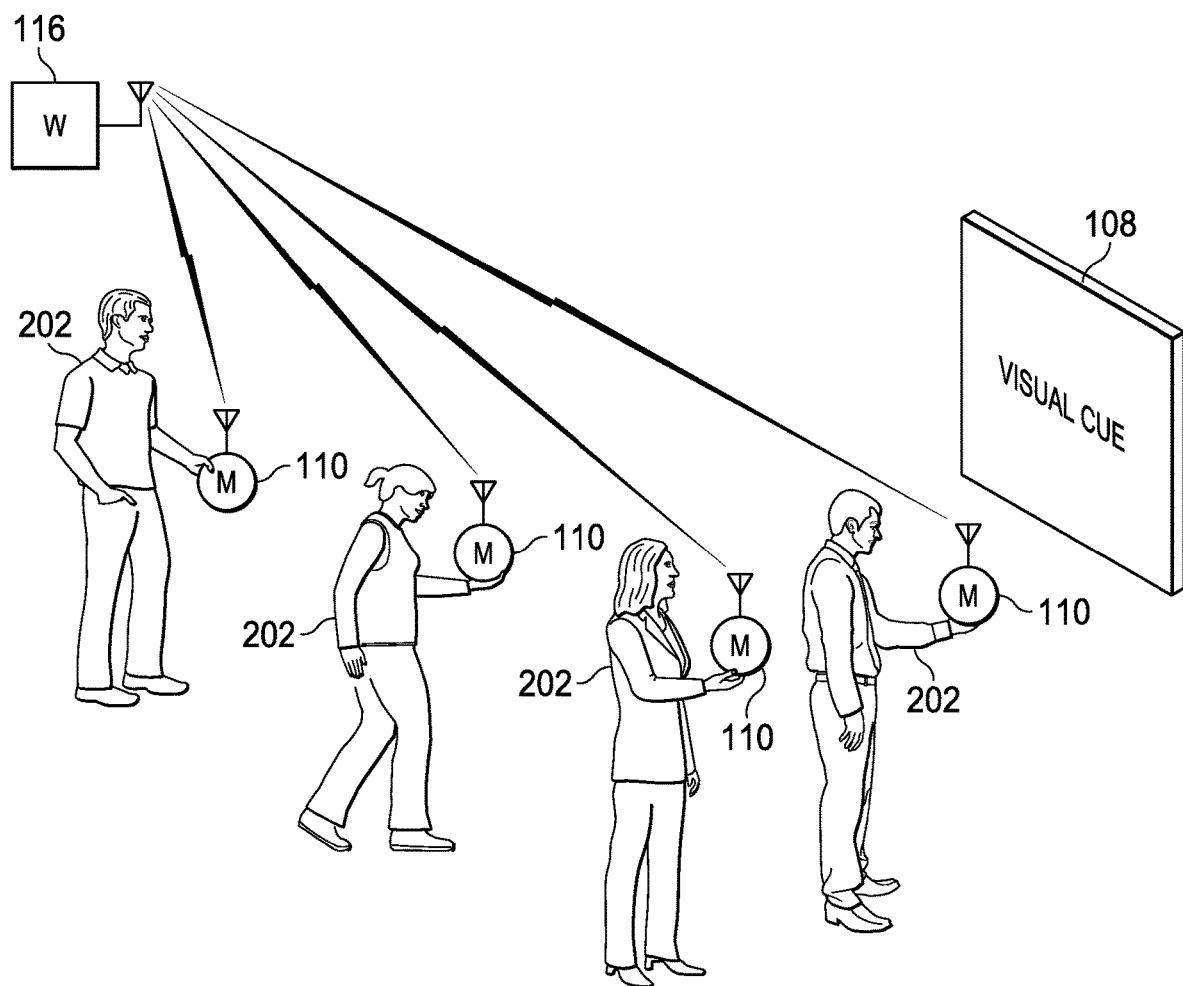
FIG. 2 illustrates a diagrammatic view of multiple attendees interfaced with a screen on which advertisements are presented.

Referring now to FIG. 2, there is illustrated a diagrammatic view of a plurality of individuals 202 with their associated MUs 110. The display 108 is illustrated as providing a visual cue in the form of some type of program, advertisement or the such that will be followed with or associated with a visual cue that, if the individual 102 is viewing the screen and is paying attention to the advertisement, will be enticed to actually make a selection and, upon making a selection, this selection or responses sent back via the wireless receiver 116 two the local CO 120.

Figure 3:
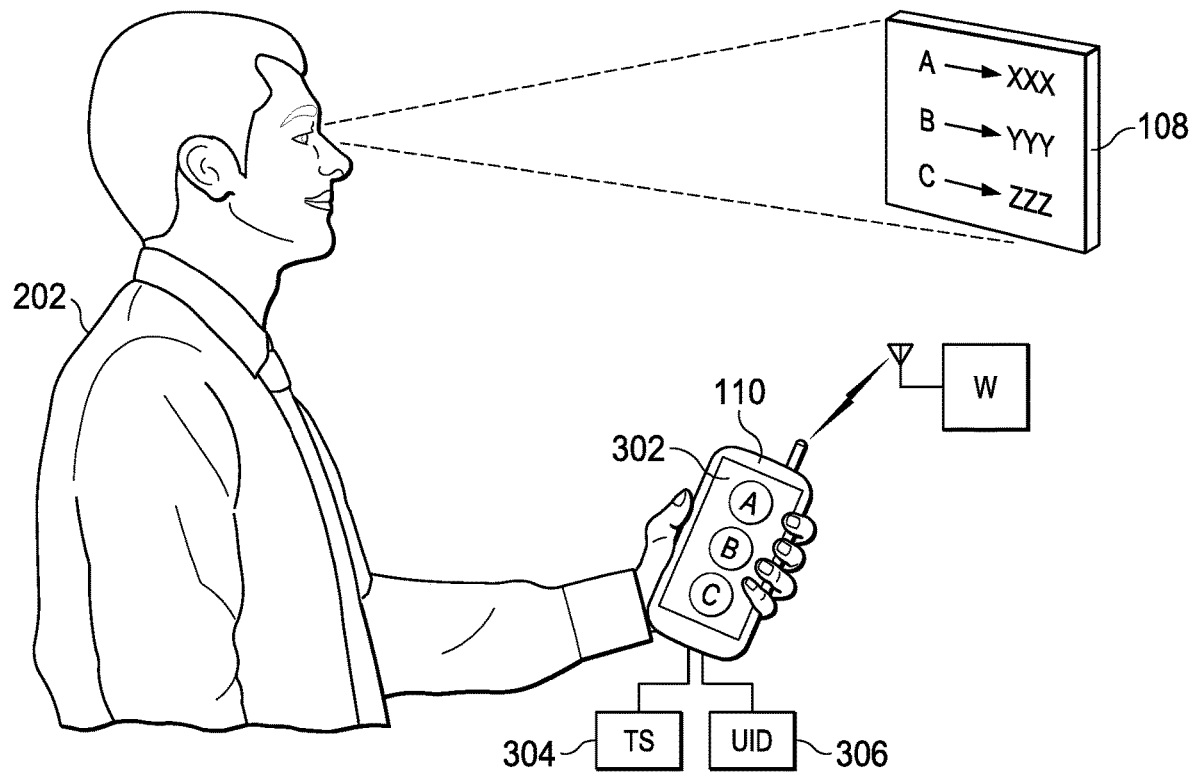
FIG. 3 illustrates a view of a single attendee interfacing with the screen and choices provided thereon and their mobile units and the selections provided thereon.

Referring now to FIG. 3, there is illustrated a diagrammatic view of a single individual presented with three responses on the display 108, these being illustrated as the letter A, the letter B, and the letter C. Each of these is associated with some type of information which allows the individual 202 to discern these particular choices. They may be some type of contest providing different selections. It may be that the particular cue requires a single response just to indicate that the user is paying attention to the screen. For example, it could be a contest that allows a responder the possibility of entering a contest, i.e., "press A on your device to enter your seat number in a lottery to win a certain prize." The MU 110 is provided thereon a screen 302 having those three selected letters available for choices. By placing their finger over one of the selections, the user creates a response that is then combined with a timestamp 304 and the created UID 306 back to the local CO 120 for processing thereof. It should be understood that, once the UID is created by the MU 110, this is now a UID that is carried temporarily in the MU 110 until the MU 110 either leaves the venue 102 or there is some type of timeout period of, for example, two hours.

The result of this overall operation is that a device, once entering the gate and initiating the application, creates a UID on the device that defines that device in a local database. Thereafter, any response can be correlated with the query in the substance of that query as long as the response is sent within a particular time window. For example, a query would be transmitted to the attendees and, during the transmission or slightly thereafter, there is a defined time window within which a response must be made. As such, even though the button associated with the letter A is selected for different queries, it is easy to discriminate in the database what information that particular response was associated with.

Figure 4:
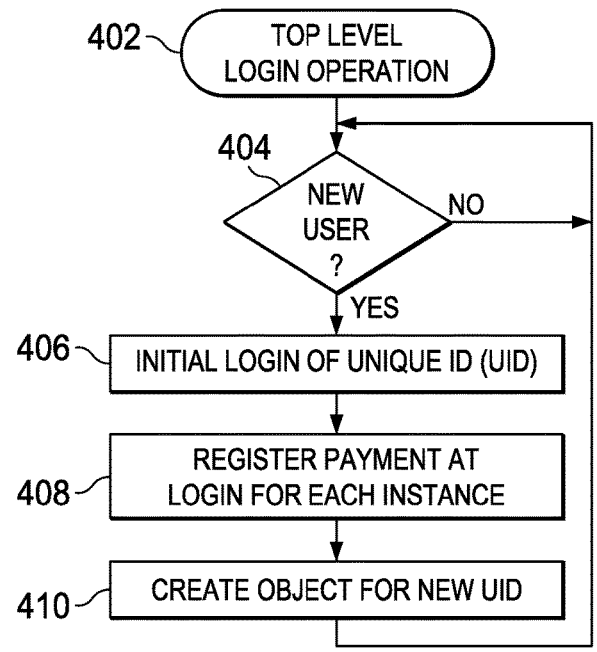
FIG. 4 illustrates a flowchart depicting the top level login operation.

Referring now to FIG. 4, there is illustrated a flowchart of the top level login operation, which is initiated at a block 402. This then proceeds to a decision block 404 to determine if a new user has entered the system. This is typically determined at the gate when the user passes through the gate or when an application is initiated. This may also be determined when a user answers an initial query, in addition to providing the user's seat number. If it is indicated that a new user is present, the program proceeds along a "Y" path to a block 406 to login an initial unique ID (UID) for that device. The program then proceeds to a function block 408 in order to register payment at the login event for each instance of a device passing through the gate or initiating their application. This payment operation will be described in more detail but, in general, the way that revenue is collected on this particular overall operation is that a flat fee is provided for each device that is registered for a particular event. The flat fee may be for any value. Thereafter, all of the data collected, whether the data is voluminous or not is immaterial to the overall revenue-generating model. Thus, then a defined amount of money can be collected depending upon the number of attendees while the advertisement level or volume has no effect on the overall revenue model. However, data is, to a large extent, owned by the central office. After registration of the login instance and the registration of the payment for that instance, a new object is created for that new UID in the local database, as indicated by a block 410. The flowchart then loops back to the beginning.

Figure 5:
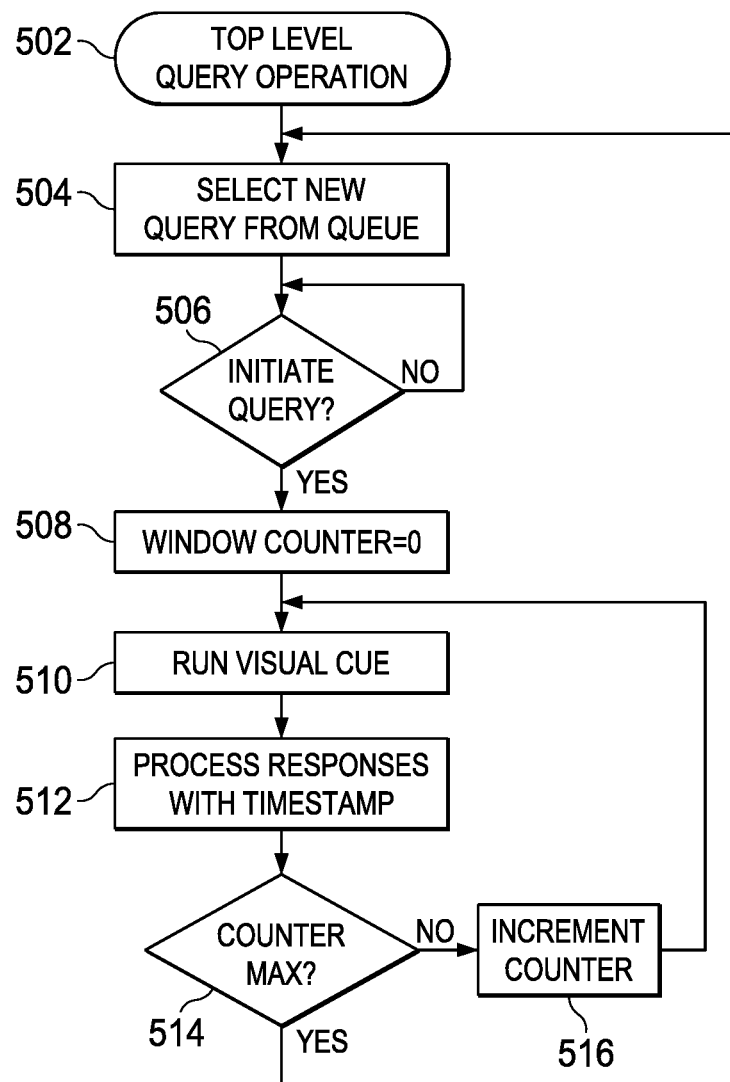
FIG. 5 illustrates a flow chart illustrating the top level query operation.

Referring now to FIG. 5, there is illustrated a flowchart for the top level query operation, which is initiated at a block 502. The program then flows to a block 504 in order to select a new query from the queue of queries. In general, when the system is set up, there will typically be some type of programming control over the information that is presented to the attendees at the event in the venue 102. This will, from overall point of view, allow each query to be independent within the database. However, they will be placed in the queue so that they can be individually selected at particular times and associated with particular advertisements. The program then flows to a block 506 to determine if the query has been initiated, which will occur at a defined time within the overall program schedule. The program then flows to a block 508 in order to set a window counter to a null value. As described hereinabove, each query requires a response to be returned within a defined time window. This actually gives context and meaning to a response. Otherwise, a simple key interface with a defined set of symbols, letters, or numbers would not be possible. In this matter, the letter A can be used multiple times for multiple queries and have a different meaning associated there with any statistical analysis of the overall data structure.

The program then flows to a function block 510 after it has been initiated and sent to a null value to run the visual cue. This way they see some type of advertisement with some type of enticing response required. The program will then flows to a function block 512 in order to process all of the responses received within the window, each of the responses having a timestamp associated therewith such that only responses received with a timestamp within the query window will be logged. The program then flows to a decision block 514 to determine if the counter is a maximum value, i.e., the end of the query time window. If not, the program flows along the "N" path to a block 516 in order to increment the counter and then back to the input of the block 510. This will occur until the counter has reached its maximum value, at which time flowchart will back around to the input of the block 504 to select the next query.

Figure 6A:
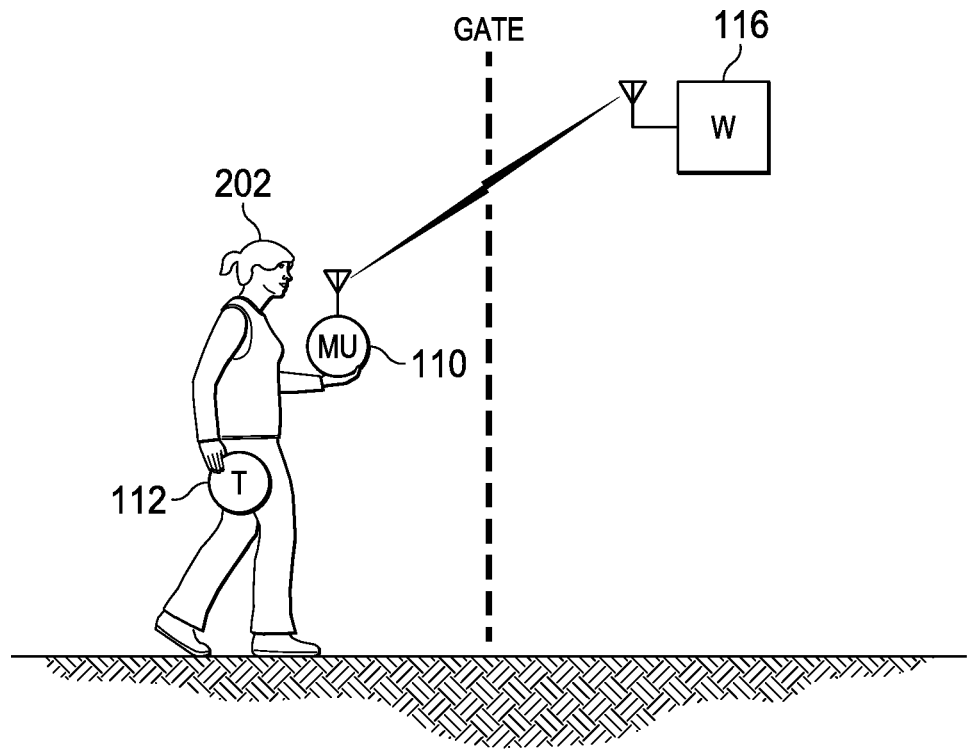
FIGS. 6A-6C illustrate examples of the initial registration when entering the venue.
Figure 6B:
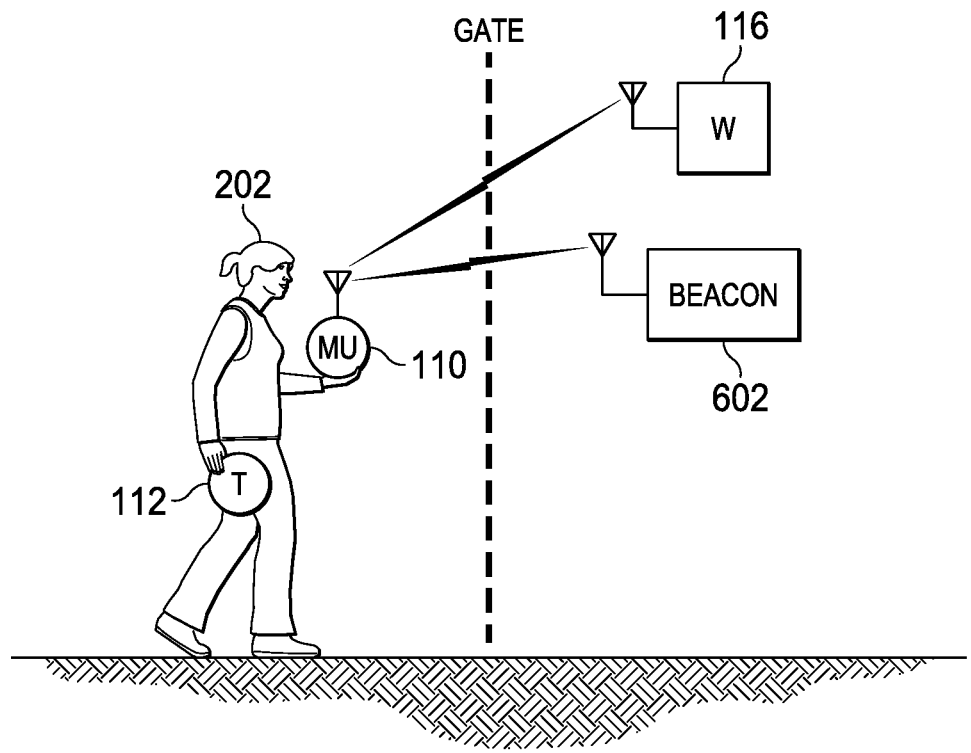
Figure 6C:
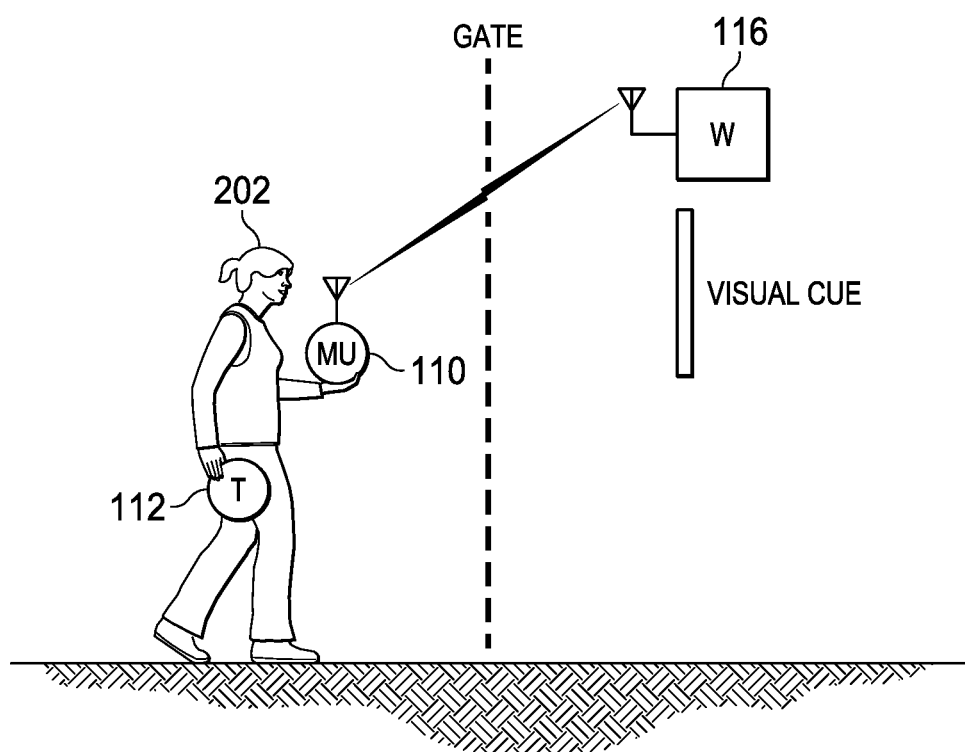

Referring now to FIGS. 6A-6C, there are illustrated three different diagrammatic views of how the presence of an individual 202 is recognized at one of the gates 104 or 106. In the embodiment of FIG. 6A, the individual 202 has the ticket 112 associated therewith, and, upon reaching gate, the individual 202 is prompted by some type of signage or the such to activate their application. Upon activating their application, the individual 202 can be presented with a screen to select a particular response which, when transmitted to the wireless device 116 with the created UID of the MU 110 and information regarding the selected response. As will be described hereinbelow, that is defined as a Response ID (RID). The second embodiment associated with FIG. 6B, the individual 202 is recognized by a beacon 602 which generates a signal that can be scanned by a separate receiver on the MU 110. These typically operate under IEEE 802.15.XX protocol, and they typically have some type of unique ID associated therewith and, in some instances, especially with the beacon, a command structure that allows more than just an ID to be sent. These can be a Bluetooth system or a BLE system or a Zigbee system or other similar systems. The point is that the application running on the MU 110 can recognize this ID and, upon recognizing this ID, can launch the full program and display the screen to the individual 202. The individual 202 then enters the ticket number and the MU 110 then creates the UID and generates a response, i.e., it answers a question which is an initial question, and then transmits this to the wireless device 116 for transmission to the local CO 120 for registration.

In the embodiment of FIG. 6C, there is illustrated an embodiment wherein the individual answers the initial question via some type of visual cue that is presented at the gate. This is a special visual cue that may be permanent. The user must answer this question in order to be registered. The screen of the user may actually display a simple display indicating to the user that they must view this visual cue at the gate and enter it in order to be eligible for a prize. This will prompt the individual 202 to input information from the ticket in additional to answering the response. Again, what is required to register the particular device with the local CO 120 is to generate UID from the ticket and then answer a question and provide one of one or more available responses to that question and forwarded the UID and RID to the local CO 120.

Figure 7:
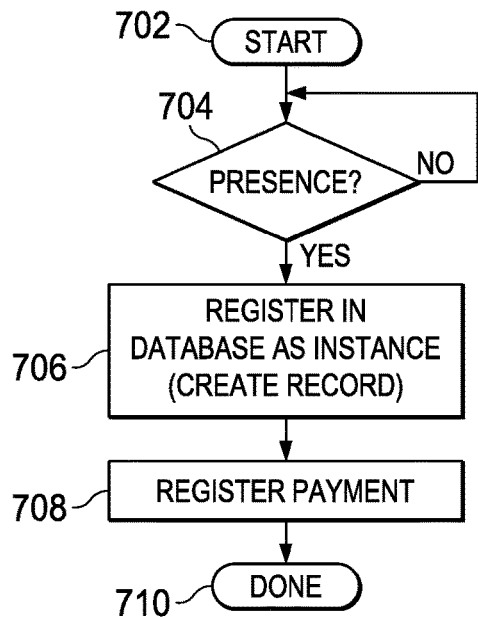
FIG. 7 illustrates a flowchart for the overall registration operation.

Referring now to FIG. 7, there is illustrated a flowchart depicting the overall detection of the presence of an individual at a gate, which is initiated at a block 702 and then proceeds to a decision block 704. This decision block 704 determines if it has detected the presence of a new device entering the venue 102 and, if so, the program proceeds to a function block 706 to register that user in the database as an instance, i.e., it creates a new record for that individual device which, thereafter, when it receives the UID from that device in associated with a response, it can recognize that a particular device has responded. This is important in that, for example, an individual might respond with multiple identical responses to a given query. What is necessary from the messenger's point of view is to know the number of separate devices, i.e., separate UIDs, that responded to a particular query. Thus, every one of the UIDs generating the responses to a particular query with a particular timestamp such that they are associated with that particular query will be logged, such that the messenger can now have a very clear and instant feedback as to the number of individuals actually paying attention to their particular advertisement. For example, if there were 10,000 attendees at an event and 5,000 responded to a particular query, this would indicate to the messenger that their advertisement actually was viewed by 5,000 attendees. Without this system, it is nothing but speculation as to how many of the attendees are actually viewing the advertisement.

The program then proceeds to a function block 708 after registration in the database to basic register a payment, as will be described hereinbelow, to indicate that a new UID has been added to the system. The program then proceeds to the "Done" block 710.

Figure 7A:
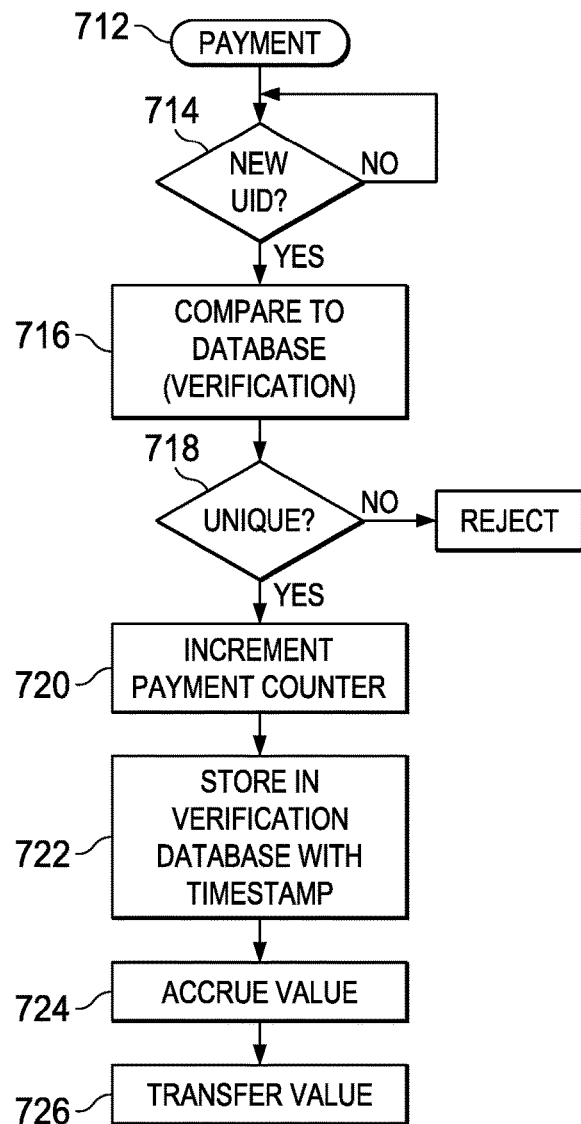
FIG. 7A illustrates a flowchart depicting the payment operation.

Referring now to FIG. 7A, there is illustrated a flowchart depicting the overall revenue model, which is initiated at a block 712 and then proceeds to a block 714 to determine if the new UID has been created. It should be understood that it is possible for an individual 202 to input the wrong seat number and, as such, duplicating another seat number that is already been entered into the system. If the UID is associated only with the seat number, there could be a possibility of a duplicate. If it is a new UID, the program proceeds to a function block 716 to determine if there is a duplicate in the database due to the input of a wrong seat number or such. This is the local database or the verification database. Program then proceeds to a decision block 718 to determine if it is unique and, if not, it rejects and, if so, it proceeds to a function block 720 to increment a payment counter. This payment counter information is stored in the verification database with a timestamp for the particular increment, as indicated by a block 722, and then the program flows to a block 724 in order to accrue the value and into a block 726 in order to transfer value.

Figure 8:
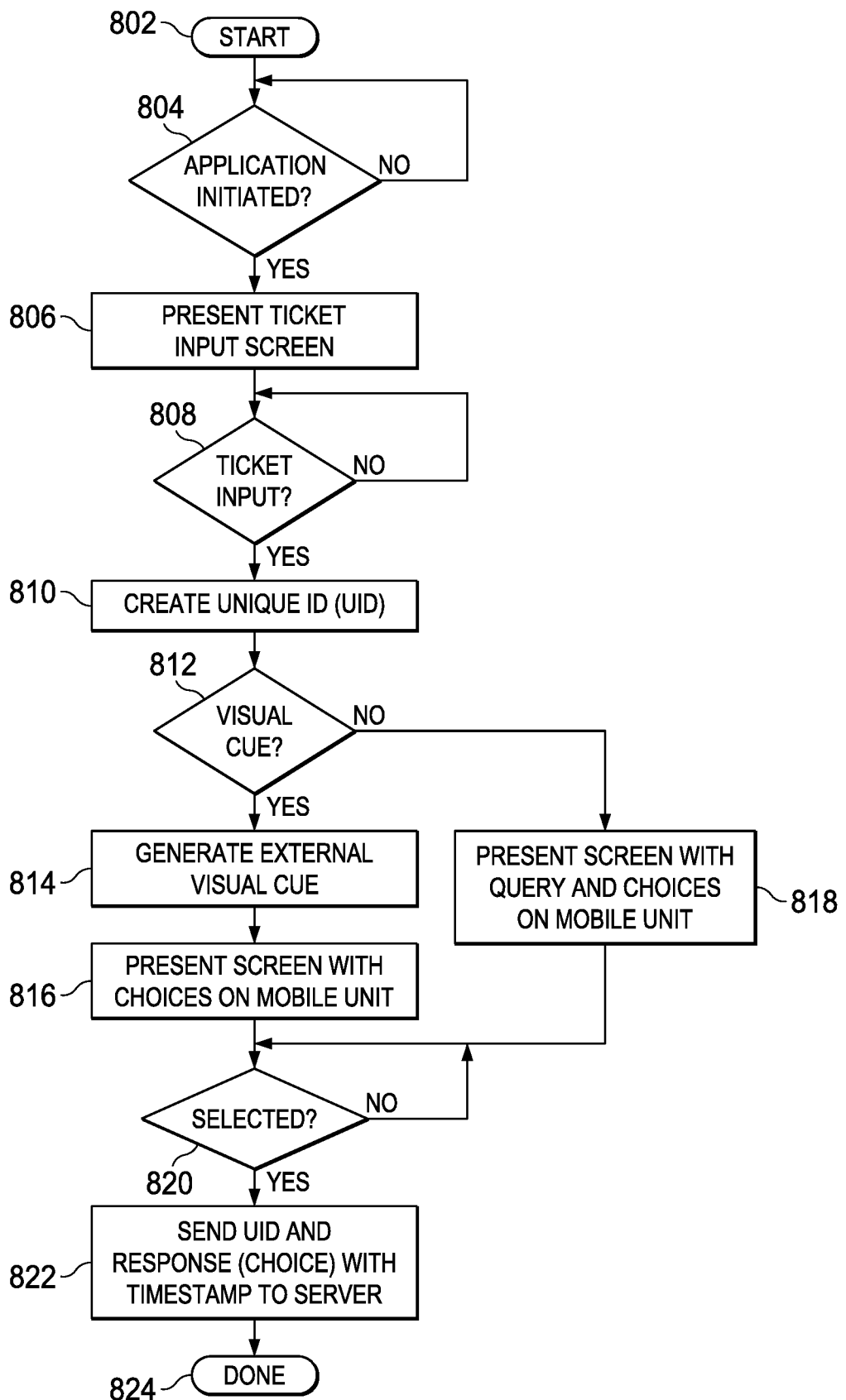
FIG. 8 illustrates a flowchart depicting the overall operation of creating the unique ID.

Referring now to FIG. 8, there is illustrated a flowchart depicting the operation at the MU 110, which is initiated at a block 802 and proceeds to a decision block 804 in order to determine if the application on the MU 110 has been initiated. If so, the program flows to a block 806 to present the ticket input screen to the individual 202. The program then flows to a decision block 808 to determine if the ticket information has been input. As noted hereinabove, that input is basically the section, row, and seat information that is typically on the ticket. However, any information that is unique to the ticket can be provided as input information. One advantage, however, of having the actual "physical"

location of an individual is in a situation where in a prize is delivered to that individual as a result of some response. It may be that query is to require the individual to continually "tap" their response key at a rapid rate and for a long duration of time and the individuals that exceed a particular threshold will be awarded, for example, a T-shirt. This can then be delivered to their seat.

After the information on the ticket has been acknowledged as having been input, the program flows to a block 810 in order to create the unique ID (UID) on the device itself. This UID, as described hereinabove, is basically the information regarding the section, row and seat information associated with the ticket, in one example. This is created on the device and stored on the device as a local value. The program then flows to a decision block 812 in order to determine if the next step, the requirement that a response be provided, is to be provided by a visual cue. The visual cue could be a sign at the gate that indicates to the individual that they are to initiate their application on their device and then depress "1" for an indication of the Male gender and, for indication of the Female gender, depress "2" when the display of the potential or available response buttons is displayed to the individual. Of course, the display will only be displayed after the operation is initiated. This is the process that is associated with the "Y" path which flows to a function block 814 to generate external visual cue, either in real time or as a fixed display, and then the program flows to the function block 816 to present the screen or display with the various choices on the user's device. If, alternatively, no visual cue is provided externally, the user is presented on their device with a screen that provides a choice with a query, such as "select your gender" with only two choices provided, "1" for the gender Male and "2" for the gender Female, as indicated by block 818. Once user has selected one of these two, then the application will shift into the full response mode and a full-screen of all available responses will be displayed, as will be described hereinbelow.

The program then proceeds to a decision block 822 to determine if the selection has occurred, and, if so, the program proceeds to a function block 822 in order to send the created UID and that the response code (RID) along with a timestamp to the server and in the program proceeds to Done block 824.

Figure 9:
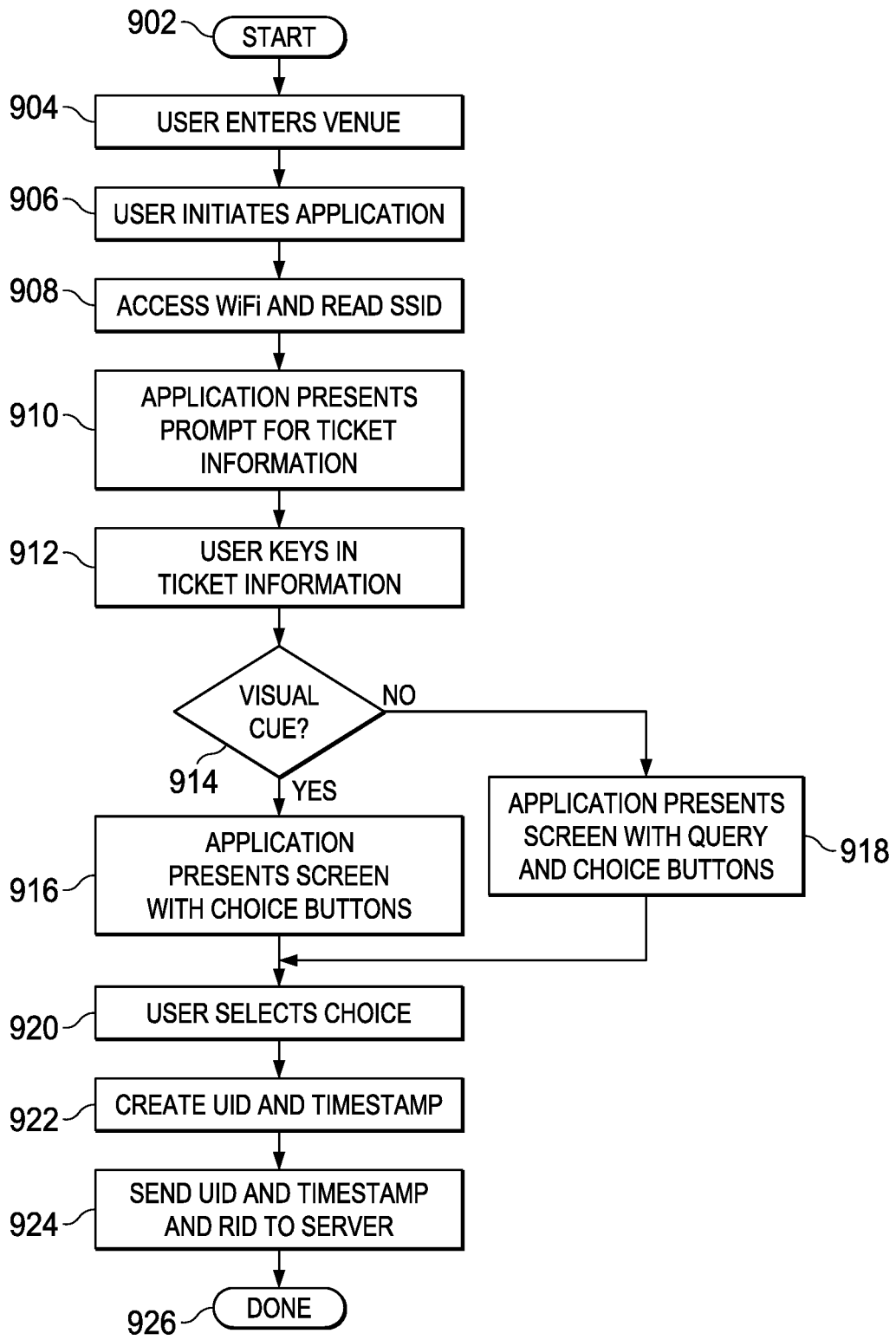
FIG. 9 illustrates a flowchart depicting the operation of creating the unique ID at the user's device.

Referring now to FIG. 9, there is illustrated a flowchart depicting the overall operation of the user entering the venue and the overall operation. The program is initiated at a block 902 and then proceeds to a block 904 wherein the user enters the venue. Once the user enters a venue, the user then initiates the application, as indicated by block 906, which, as described hereinabove, can be initiated by the user, or some external device such as a scanner or gate beacon or the such can be utilized to automatically activate the application upon passing a gate. When the application is initiated, it will access the network and determine the SSID or some similar identification information associated with the network from the network, as indicated by block 908. The application will present to the user a prompt for ticket information, as indicated by block 910. The program then flows to block 912 wherein the user will key in the ticket information. However, alternatively, there could be provided the ability of the user's device to actually scan the ticket with the camera which will allow the camera to extract unique information there from. The unique information could be, in the one disclosed embodiment, the section, row, and seat information associated with the ticket or could be some unique code on the ticket. As long as this information is unique as to all other individuals bearing a ticket, this will facilitate the operation of the overall disclosed embodiments. Once the ticket information has been input, this allows the unique UID to be created with that information. The program then flows to a decision block 914 in order to determine if there is a visual cue. If there is a visual cue, the application will present the user with choice in block 916 providing choice buttons associated with a particular visual cue that are necessary in order to respond to the visual cue. If no visual cue is presented externally, the program will flow to a block 918 to present the user with a screen having both a query and the choice buttons associated there with. Once the choice has been made, as indicated by a block 920, the program flows to a function block to 922 in order to create the UID with a timestamp and then sends the UID and the timestamp in association with the RID to the server, as indicated by block 924. It should be noted that each available choice will have some code associated there with. As will be noted here below, there are a limited number of available choice buttons that will be provided to user. These will typically be limited to 40. Thus, a five-bit code is all that is required in order to support this number of available choices. Thus, the RID will be a code from 1-40 in binary form. This is a relatively small amount of information to be provided in a transmission. The program will flow to a "Done" block 926.

Figure 10A:
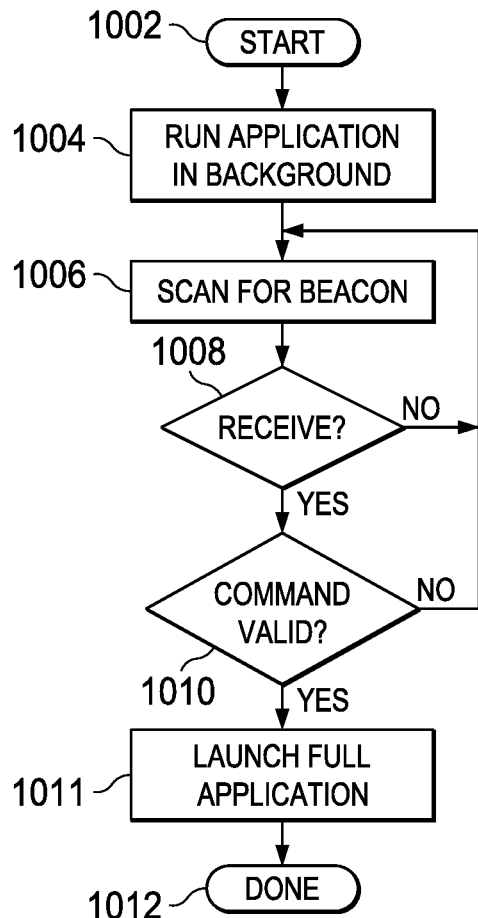
FIGS. 10A and 10B illustrate flowcharts for launching the application based on a presence determination at the gate of the entrance.
Figure 10B:
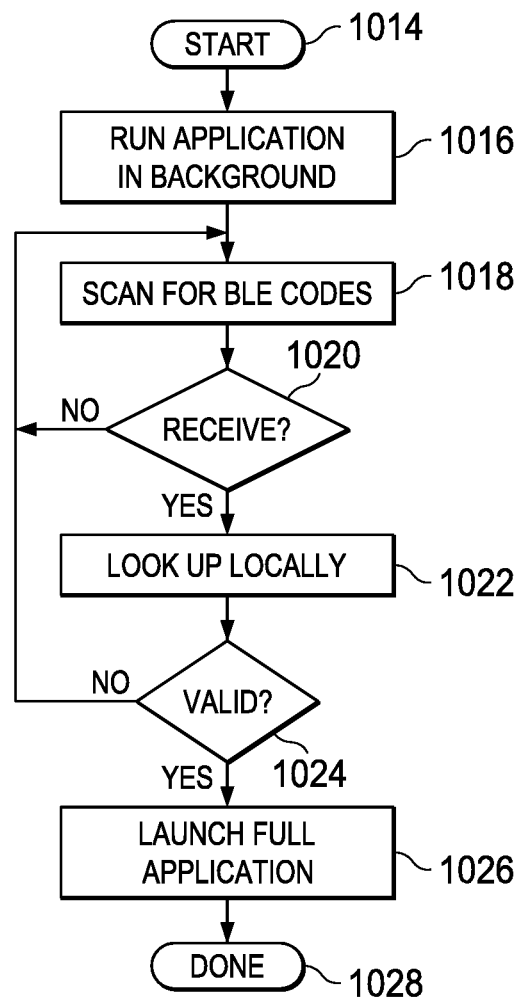

Referring now to FIGS. 10A and 10B, there are illustrated flowcharts depicting the operation of presence recognition operation for determining when a device, an MU 110, is passing through a gate. Referring specifically to FIG. 10A, the program is initiated at a block 1002 and then proceeds to a block 1004 to run the application in the background. In this mode, the full application is not running but, rather, a background application that performs a "sniffing" operation for known signals on one of the multiple radios that may exist within the device. For example, some devices will have a cellular transceiver interfacing with the cell network, and 802.15.4 radio for interfacing with Wi-Fi, a Bluetooth transmitter and maybe a Zigbee transmitter. Additionally, a thread transmitter may also be provided for interfacing with these types of devices. This background application merely looks for the presence of one of these transmitting devices external to the device in order to read its identifying information. This is unique to that device and can be, through a lookup table locally on the device, utilized to take some action such as launching the full application.

The program proceeds to a function block 1006 in order to scan for, in this example, a beacon. A beacon is typically at a transmitting device that not only has a unique ID but also transmits data along with its transmission. This is a one-way transmission and does not require any type of handshake in order to receive the information. Some technologies, such as Bluetooth, do require" hearing" in order to receive information from the transmitting device. The program then proceeds to a decision block 1008 in order to determine if any beacon information has been received. If so, the program flows to a decision block 1010 to determine if any information received from the beacon, such as a command, is a valid command which can be operated on by the background program or application. If not, the program flows back to the input of function block 1006. If the command is valid, the program flows to a function block 1011 in order to launch the full application and then to a "Done" block 1012.

Referring now to FIG. 10B, there is illustrated a flowchart depicting the use of a BLE transmitter. The BLE transmitter is a device that can not only send a unique identifier but also transmit information without requiring "pairing." Program is initiated at a block 1014 and then proceeds to a block 1016 in order to run a background application for the sniffing operation. The program then flows to a function block 1018 in order to scan for BLE codes, i.e., the unique identifier. The program flows to a decision block 1020 to determine if such has been received and, if not, back to the input of function block 1018. Once received, the program flows to a function block 1022 in order to lookup the code locally. If the code, stored in a local database, is valid, this indicates, via a decision block 1024, that the code is a recognizable code, i.e., one that is associated with the overall operation of the system. If so, the program flows to a function block 1026 in order to launch the full application and then to a "Done" block 1028.

With the automatic recognition of an external transmitter with a small local transmission range disposed at an entrance gate, all that is required for an application to be launched is just a recognition of the presence of a particular device within the transmission range of a beacon or similar type transmitting device. This, of course, only initiates the application. There is still a requirement that the individual viewing the screen, which is typically achieved by some type of audible tone or prompt, is to provide some type of response. As noted hereinabove, that response may be a response to a query actually output by the device, which indicates that at least the individual is looking at their phone and interfacing with the application. It could be that the response is in response to viewing some type of visual cue local to the gate. This visual cue could be a "fixed" visual cue or it could be a time varying visual cue. With a time varying visual cue, the timescale that is provided on the response that is sent can be utilized to verify that this response was activated at the gate as opposed to somewhere else. Of course, that necessitates that, not only does the unique ID have a timestamp associated with it at the time it was created, but also that the response to the visual cue be timestamped.

Figure 11:
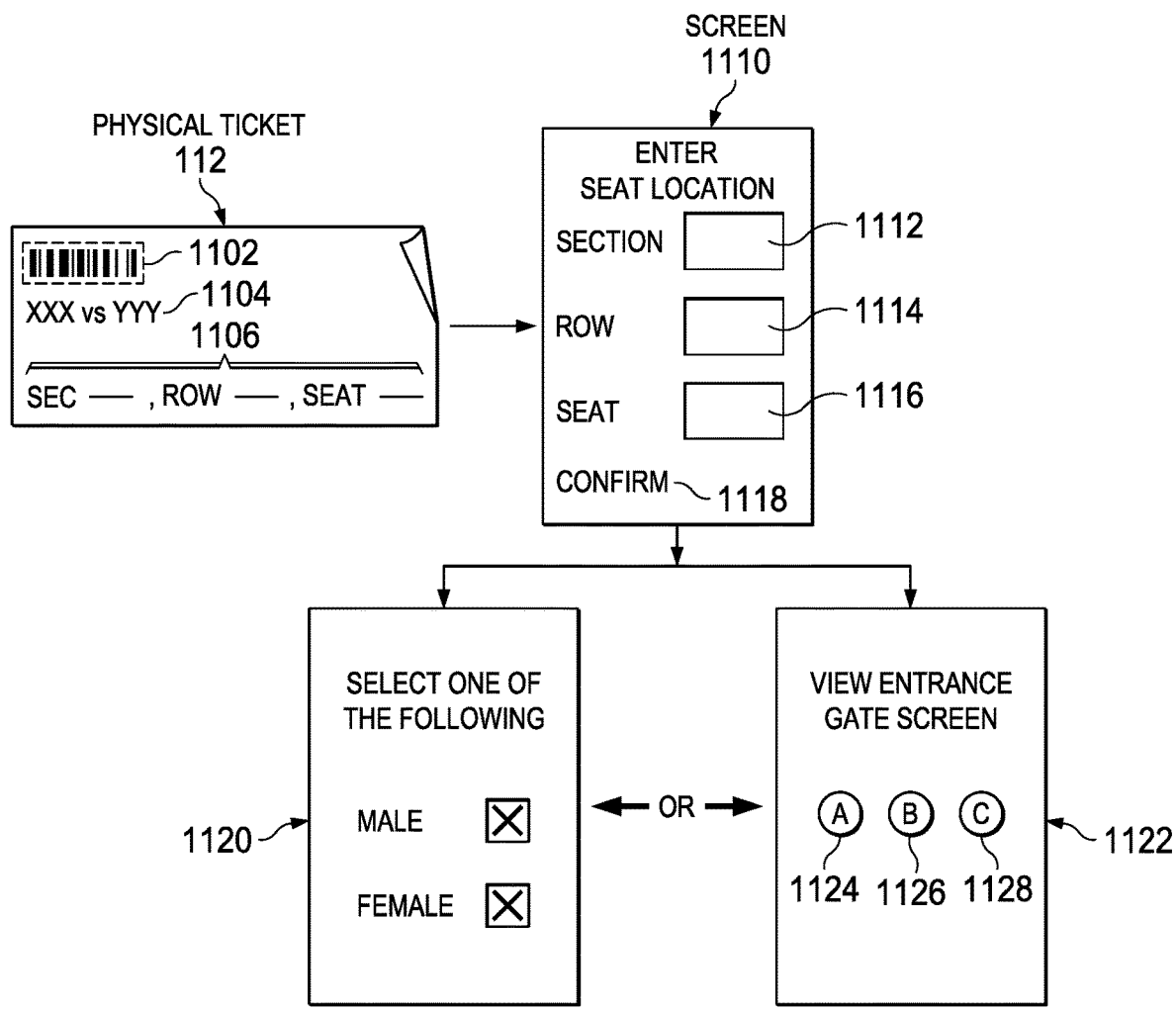
FIG. 11 illustrates a diagrammatic view of the screen interface with the user for entering the ticket information and creating the unique ID.

Referring now to FIG. 11, there is illustrated a diagrammatic view of the initial screen display to the user of the MU 110. As described above, there is provided a ticket 112 that has associated therewith multiple fields. There is provided with some type of unique barcode 1102, information about the event 1104 and also the seat and row information in a field of 1106. In the disclosed embodiment, the section, row and seat information is what is input. The screen provided is represented by a reference numeral 1110 and displays a text prompt to the user to enter the information regarding the section, the row and the seat in fields 1112, 1114 and 1116, respectively.

Once the user enters this and selects a "Confirm" field 1118, then this information is utilized to create the unique ID as described hereinabove. Then one of two events will happen. The first is that a screen 1120 will be displayed that basically provides a query requesting the selection of one of two choices, in this example, either a Male or a Female gender. By selecting one of these two, a response can be generated that actually provides information to the database as to the gender of the individual. Interestingly enough, as will be described hereinbelow, this provides to the messengers information regarding the gender of each unique ID (UID) that is in the system. However, studies suggest that a certain percentage of the individuals will make a mistake on their entry for whatever reason in a certain number of individuals will actually put the wrong answer in. Thus, what will be indicated to the messengers is that statistically this person is one gender or the other, but this is not a 100% indication.

The other aspect of it will be the presentation of a screen 1122 which prompts the user to view some type of screen that is proximate to the entrance gate. The screen is utilized for the purpose of providing the first query which is required in order to actually create the entry into the database of the UID for that particular device. There is presented in this screen 1122 various response fields, in this example, 3 response fields, 1124, 1126 and 1128. In this example, there would be provided a viewable screen that provides some type of query requiring the selection of one of three selections as the response. These responses, in addition to allowing registration of the UID in the database, also provide some statistical information about a person associated with that UID.

Figure 11B:
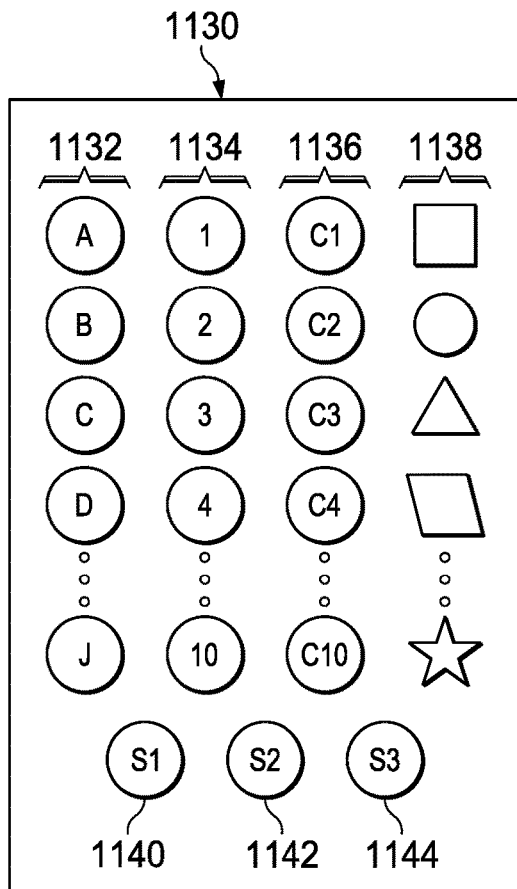
FIG. 11B illustrates a screen view illustrating the fixed selection of possible response buttons provided to a user.

Referring now to FIG. 11B, there is illustrated a depiction of an actual screen that is provided after registration of the UID for providing responses to various queries. This screen is represented by reference numeral 1130. This screen 1130 provides a fixed number of displayed response codes. There are provided a first column 1132 of output alphabetical characters, the first 10 characters of the alphabet from A through J. There is provided a second column 1134 for the first ten numerical characters from 1 through 10. There is provided in a third column 1136 the first 10 the primary colors, each color represented in a circular button. There are provided in a fourth column 1138 ten basic shapes such as a square, a circle, a triangle, etc. Thus, there are provided 40 fixed characters that will always be provided on the screen. None of these characters is dedicated to any particular response to any particular character. When building a query, designer of that query actually maps a particular response key to the database and the definition of a desired response, as will be described hereinbelow. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. First, the fact that they answered with either response indicates that there looking at the screen and this is important information to have. A further refinement of the response can be provided by mapping a particular response to certain statistical records. This will be described in more detail herein below.

There are also provided three response buttons 1140, 1142 and 1144, respectively, that are not responses that can be mapped into the database outside of the MU 110. These buttons 1140-1144 are provided for another function, and the function is to allow interface with the internal application in response to a visual cue, which will be described hereinbelow.

Figure 12:
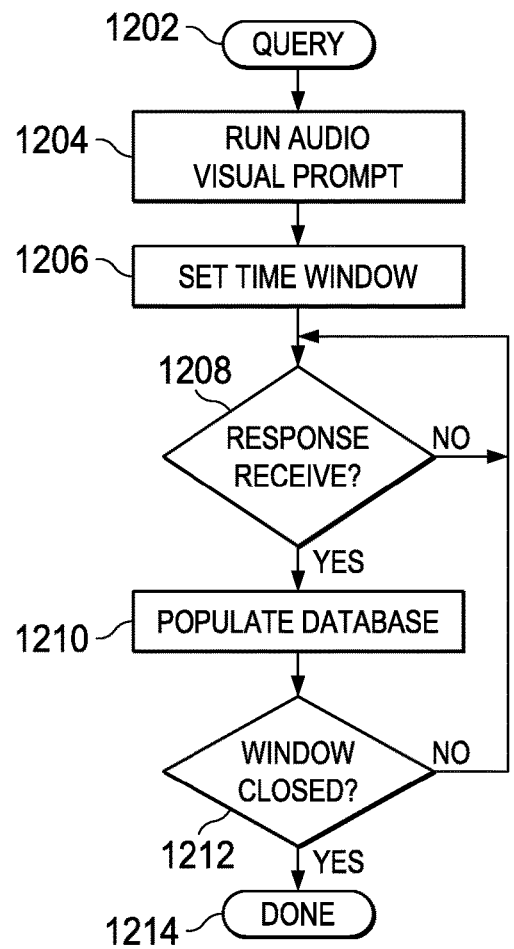
FIG. 12 illustrates a flowchart depicting the query operation for generating a query for viewing by the user.

Referring now to FIG. 12, there is illustrated a flowchart depicting the operation of running a query at a top level. This program is initiated at a block 1202 and proceeds to a block 1204 in order to run the audio or visual prompt. The program flows to a function block 1206 in order to set the time window within which a response is to be received for that particular query. The program then flows to a decision block 1208 to determine if any responses have been received and, if so, then to a function block 1210 in order to populate the database with a response, which just indicates that this particular MU 110 via its UID is actually associated with a person looking at the prompt. The program then flows to a decision block 1212 to determine if the time window has closed for receiving responses. If not, the program will continue to loop back to the input of the decision block 1208 until the time window is closed for that particular query, at which time the operation is terminated at a "Done" block 1214.

Figure 13:
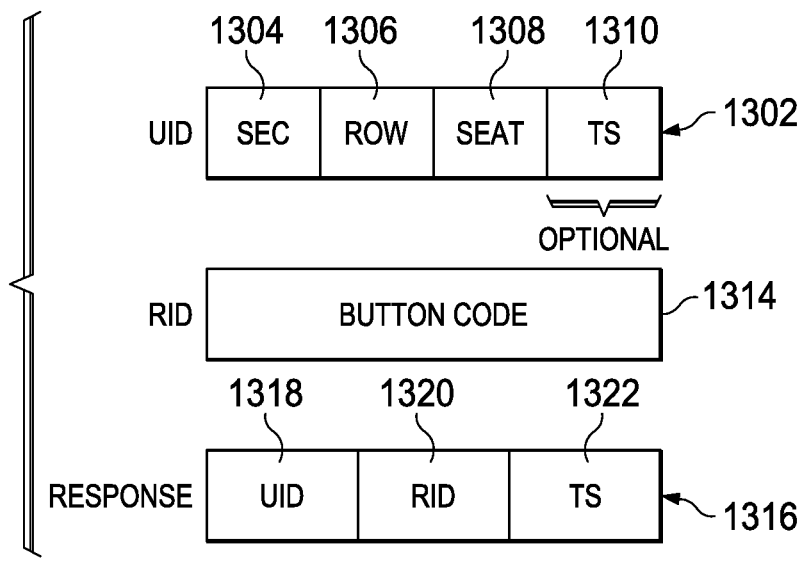
FIG. 13 illustrates the data structure of information assembled at and transmitted by the Mobile Unit.

Referring now to FIG. 13, there is illustrated a diagrammatic view of the various data structures generated by the MU 110 during registration and operation. In a first data structure 1302, there is illustrated the various data fields for the UID. They are defined as a first field 1304 associated with the section, a second field 1306 associated with the row and a third field 1308 associated with the seat. A fourth section 1310, an optional section, is associated with a timestamp that can be utilized at the time of the creation of the UID to uniquely define it in the event that somebody else actually this enters their seat number, for example. This is not a timestamp that is used for identification of the time at which the UID is transmitted but, rather, just additional information to make the UID more unique. Of course, it could also be utilized for the purpose of determining the time in which the UID was created. This particular data structure requires very little data bandwidth to transmit such, as the information contained in there is minimal.

For the second data structure, a data structure 1314 is provided for the button code for the response, which, as noted above, is the response ID (RID). This is a five bit code. The actual response that is sent is illustrated by a data structure 1316, which is comprised of a first data field 1318 having associated therewith the UID, a second data field 1320 associated with the RID, a third data field 1322 associated with a timestamp, TS. This field 1322 is actually the timestamp that is generated when the response is actually created as compared to the timestamp infield 1310 that further defines the UID as unique. Overall, this response data structure 1316 is all that is required to be transmitted in response to seeing a visual cue. There is no two-way communication that is required between the server and the MU 110, thus reducing the overhead load on the network traffic. Thus, for example, if the response data structure 1316 required three bytes of data, 10,000 participants viewing a visual cue and responding thereto would only transmit 30 Kbytes data within the window. If that window defined by the query was open for just one second, there would be required a minimum bandwidth of 30 Kbytes/sec, which is well below the lowest bandwidth Wi-Fi connection to any network. Thus, if one of the responses was to see how many times any individual associated with a UID could "tap" a particular response button, it would still be difficult, with the human response time, to exceed any practical bandwidth limit in a network. It is a minimization of overhead and the production of the actual data that is required to provide information to an messenger. Again, what is provided by the response button is both an indication of "eyes on the screen" and also some back end statistical data.

Figure 14:
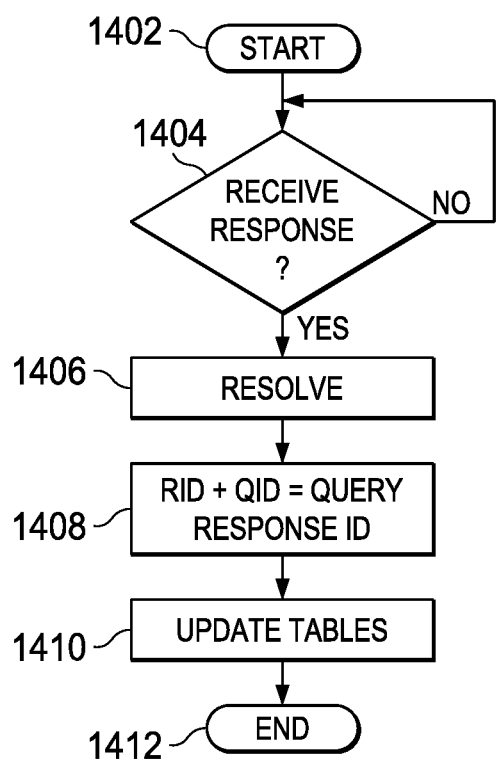

Referring now to FIG. 14, there is illustrated a flowchart for the server receiving the response, which is initiated at a block 1402 and proceeds to decision block 1404 in order to determine if a response has been received. When received, the program flows to a function block 1406 in order to resolve the particular response. What has been received at this point is a response having a UID, and an RID and a timestamp. What is resolved is, knowing the time window, the presence of a unique code which is a combination of the RID and QID (query ID), is indicated by function block 1408. This combination, as will be described hereinbelow, is a unique ID that can be utilized for back end statistical analysis. The UID is also resolved and is utilized to indicate that a particular UID has responded (noting that any time that response is referred to as being responded by UID, this also means that it is being responded by MU 110). If the query, for example, just wanted to know how many individuals are looking at the screen in response to a particular query, any response received, whether it be multiple responses or a single response, during the time window associated with the query will provide an indication, for for all received UIDs, of the number of individuals that paid attention to the query, and all that is required to resolve this particular query into any useful information is the UID. By looking at the combination of the unique RID plus QID, further information can be determined to resolution associated with other tables mapped to this particular query and response. The program will then flow to a function block 1410 in order to update various tables and into and "End" block 1412.

Figure 15:
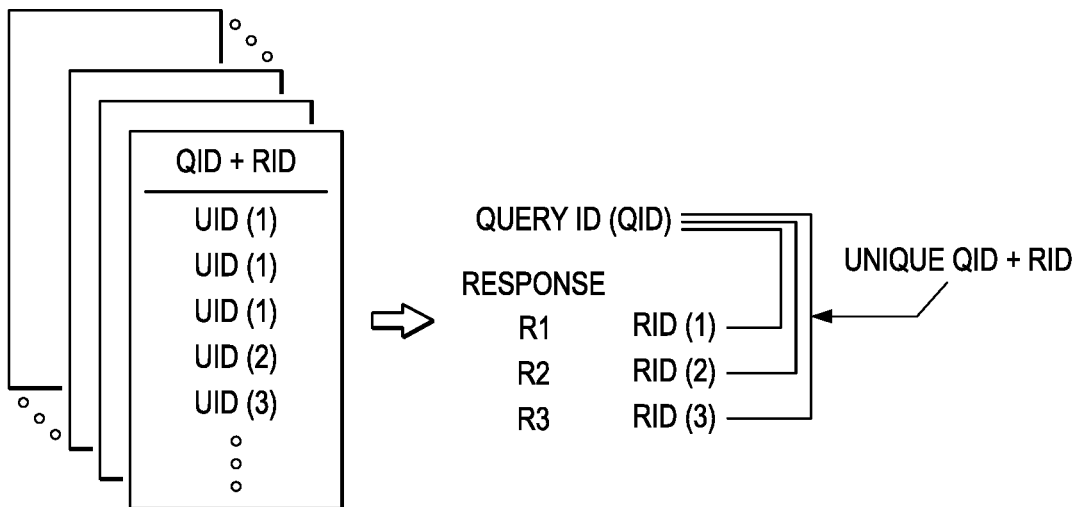
FIGS. 15-18 illustrate diagrammatic views of the various records that are generated and populated in the local database.

Referring now to FIGS. 15-18, there are illustrated diagrammatic views of how the tables are generated for various combinations of RIDs for a particular query ID (QID). For example, for a given query, there may be three responses provided, R(1), R (2) and R(3). It may be that the query presented to the individual is the choice of responses "A," "B," and "C." These particular response codes will be mapped to some type of information associated with that response. For that response, i.e., for the first response in association with a particular QID, QID+R(1), this combination being a unique ID that defines a unique object or table within the database for this combination. Thus, within this particular table associated with that unique ID, the particular UIDs that responded as such can be contained therein and each of these UIDs will provide pointer back to the actual UID record associated with that UID. FIG. 15 illustrates these particular tables.

Figure 16:
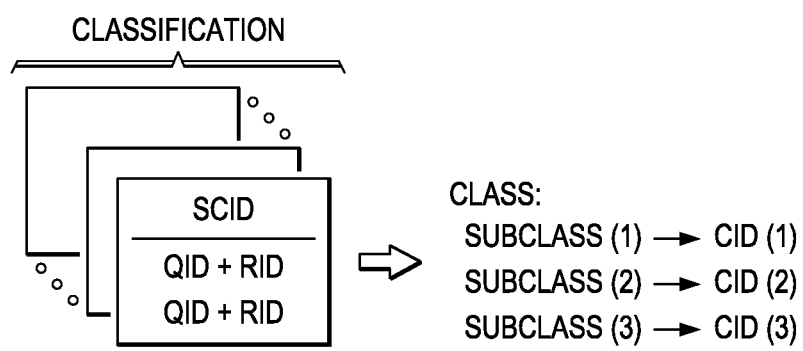

In FIG. 16, there is illustrated a further refinement of the information. As will be described hereinbelow, queries can be provided with information associated with classifications. For example, there may be a classification of "gender." This would have the sub classification, at its highest level, of male or female. Classification would have a classification ID of CID and the sub classification would have a unique ID of SCID. For example, take the example of gender. This can be so classified into possibly ten different analytical "bins." The system could be designed such that a prior knowledge of a particular generated query could be resolved into ten different percentage classifications, one wherein the gender is classified as follows:

10% F/90% M
20% F/80% M
30% F/70% M
40% F/60% M
50% F/50% M
60% F/40% M
70% F/30% M
80% F/20% M
90% F/10% M

Figure 17:
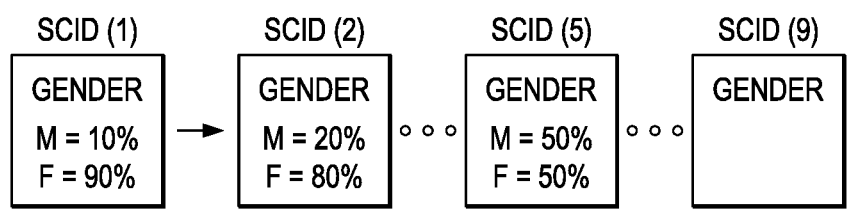
Figure 18:
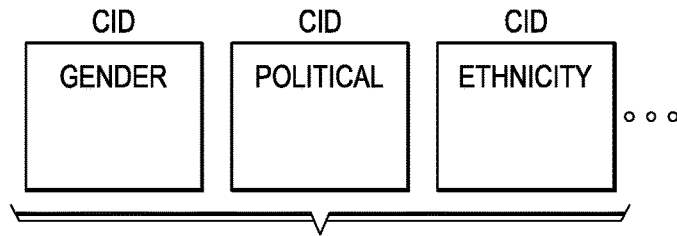

Thus, a particular response can actually be mapped to one of these statistical bins. This would thus require that the designer of the query understand that when a particular individual responds with the particular response, this will indicate to the database that, for example, 80% of the respondents are female. Each of these particular sub classifications can be mapped all the way back to the UID and the QID+RID unique code. This is illustrated in FIG. 17. The actual CID is illustrated in FIG. 18, indicating that there can be one CID for gender, one for political affiliations, one for ethnicity, etc. By utilizing prior information known to the designer of the query, each response can be mapped to multiple different classifications and sub classifications, such that just the response provided by any MU 110 can be resolved into information regarding the particular individual that responded to such. Certain information can be determined as to their gender, as to the political affiliation or as to their ethnicity and other such information.

Figure 19:
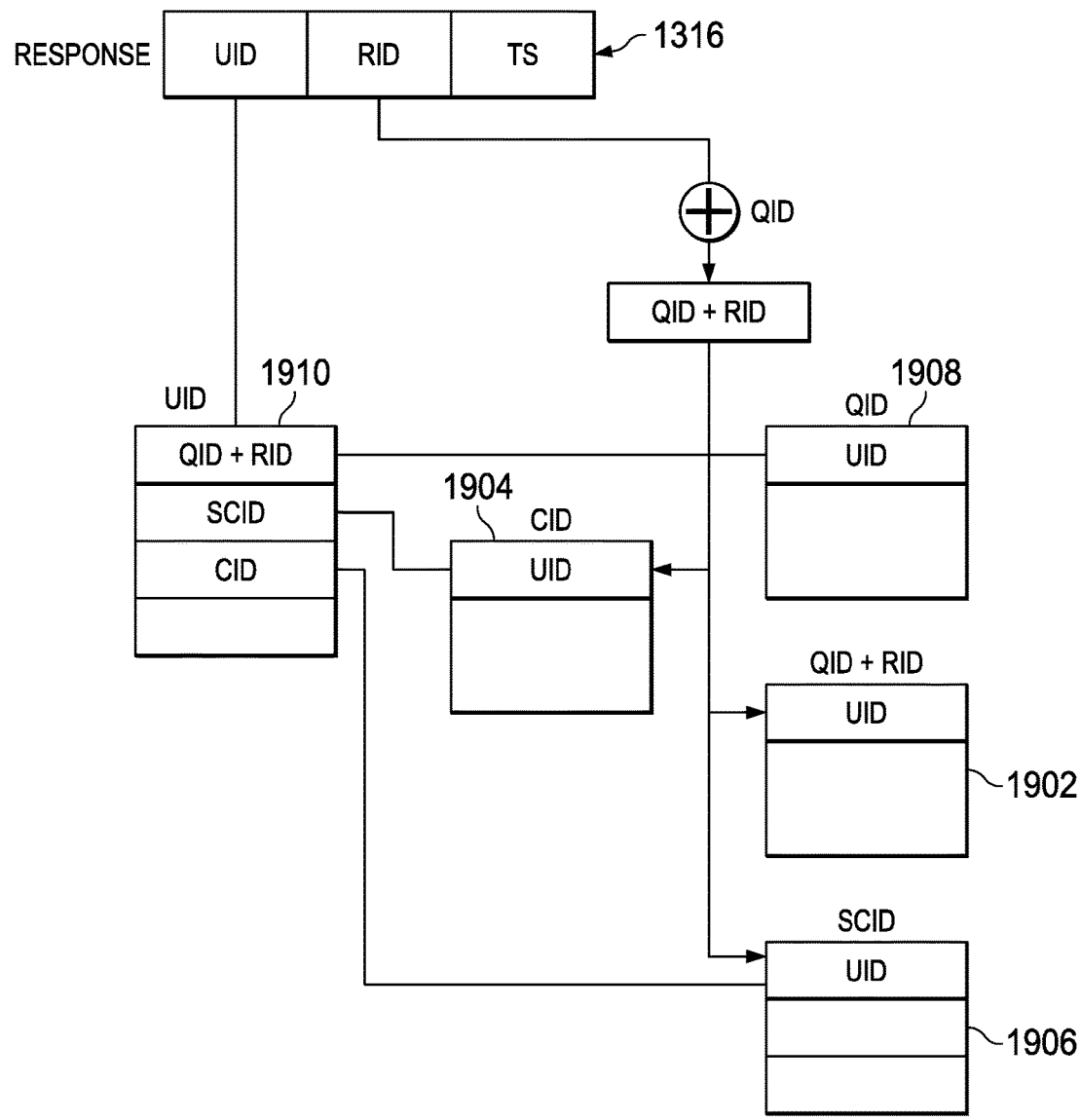
FIG. 19 illustrates a diagrammatic view of the overall relationship between multiple records and unique IDs in the system.

Referring now to FIG. 19, there is illustrated an additional diagrammatic view of how the mapping occurs. The additional response data structure 1316 is resolved such that the UID will define a UID data record or object that is to be updated with the various information provided by the analysis and the mapping of the responses. The resolving technique defines, with the response and the query in which the response was received, the unique ID for the QID+RID denoted in a table or object associated therewith. This is a table 1902, which is updated with the particular UID that responded with that particular response code. This QID+RID unique code is mapped to a CID table 1904 to place a pointer to the UID therein. This also points to an SCID table 1906 such that the UID can be placed therein. There's additionally a QID table 1908 that has the particular UID associated with this response placed therein. Thus, by looking at any one of the tables associated with the UID table, all of the UIDs that were associated with a particular response for the QID will have a reflection of the number of UIDs that responded as such. If, for example, one wanted to know how many UIDs responded to just the gender question where either response indicates some information about gender, one need only look at the CID table 1904 associated with that particular response, i.e., the one to which the QID+RID unique code was mapped to. If one wanted to look at how many respondents replied to the particular query, all that is required is to look at the QID table 1908 and this will give a total of all of the UIDs that responded to the query. There is knowledge, of course, as to how many total UIDs are in the system or are present at the event. If, for example, at halftime of a basketball game, any query was presented to the attendees and a response resulted in a 40% response, this would indicate to the messengers that 40% of the attendees were viewing the screen. Some information can be gleaned from this information. However, this provides an actual real time indication to the messengers of the fact that they were able to have 40% of the attendees with "eyes on the screen."

Figure 20:
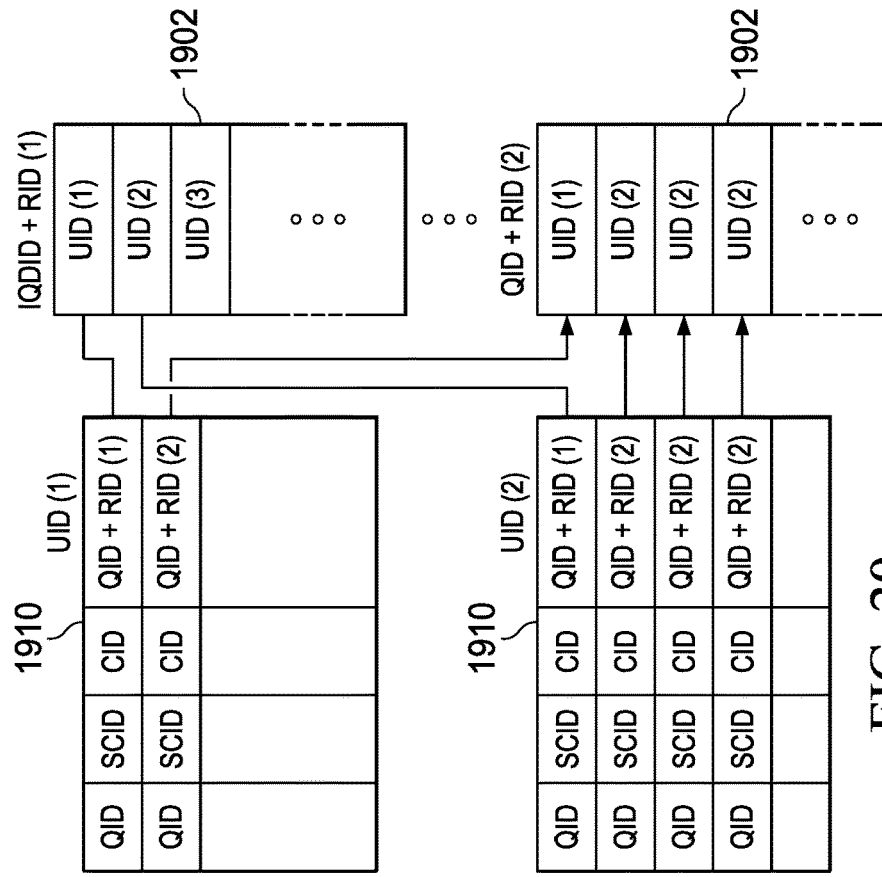
FIG. 20 illustrates a detail of the records illustrated in FIG. 19.

Partly referring now to FIG. 20, there is illustrated a more detailed diagrammatic view of the mapping operation. It can be seen that, for each UID in table 1910 that each UID has associated therewith a QID, an SCID, a CID and a QID+RID. There is shown the mapping to the table 1902 which shows multiple UIDs mapped thereto. There are illustrated two UID tables flanking 1910 Thereto. These tables also mapped to a second QID+RID table 1902.

Figure 21:
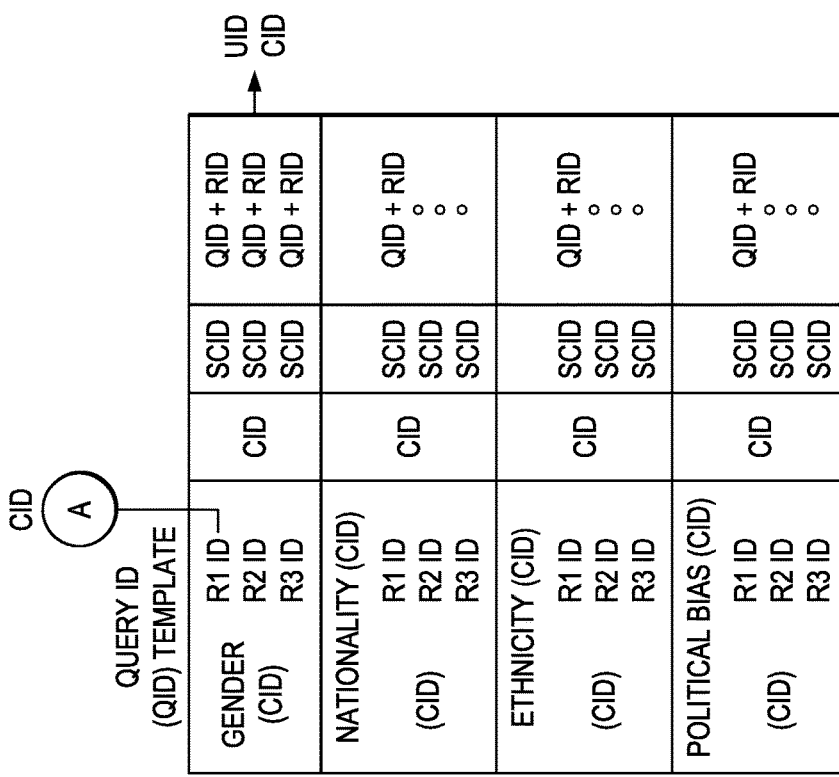
FIG. 21 illustrates a diagrammatic view of the template utilized for creating a query.

Referring now to FIG. 21, there is illustrated a diagrammatic view of an overall template for creating a query. This template provides the ability to map any particular classification and sub classification with any response. For example, illustrated in the template are four classifications, gender, nationality, ethnicity and political bias. Each of these may be selected as somehow associated with a particular query. The designer of the query will then be provided with the ability of providing any number of response buttons in their queries. Each of these response buttons just needs to be mapped to a particular sub classification ID, SCID, in order to give it meaning. Thus, the gender has a CID, to which the particular query is mapped for a particular query. This will be CID gender ID. There may be, as noted hereinabove, nine sub classifications. Each of the response buttons can be mapped to one of the sub classifications. It is illustrated that the response R1 ID is associated with the RID to the particular map button, for example, the "A" button. This will be mapped to the particular unique QID+RID code for that combination of the particular QID for the query being designed and the RID associated with the "A" button. This will be generated as a particular object in the system or record for that unique D. This would be mapped to a particular SCID. It is asserted to keep in mind that this particular SCID is a predefined SCID, such that it can be utilized to collect data from multiple queries. It is not associated with just this particular query only but the particular QID is associated with query and the particular mapping of the RID to a particular button for that query in the form of the unique ID, QID+RID. It is noted that the first RID, that associated with the R1 ID associated with the "A" button will exist for each of the particular classifications, i.e., for the nationality CID, the ethnicity CID and the political bias CID. Thus, what will happen is that, upon providing a response via the "A" button for that particular query, this particular UID will be mapped into each of the SCIDs to which that response button is mapped. By looking at the QID table, the total number of UIDs responding thereto will be known. By looking at an SCID table, all of the responses over all queries will be known. With respect to gender, for example, if there were nine different bins associated with nine different SCIDs, a bell curve could be generated from all of the data that is received for the multiple queries indicating the general gender makeup of the crowd. This is all derived from just simple responses received from multiple MUs 110 transmitting a minimal amount of data responses for a query to a server.

Referring back again to FIG. 11B, there are provided 40 fixed characters that will always be provided on the screen. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. A further refinement of the response can be provided by mapping a particular response to certain statistical records. Each of the responses may have statistical information associated therewith. In this way, each response may have an SCID associated with that particular response in the given time window. Again, the "A" response may have associated with it the gender SCID corresponding to a 0.6/0.4 Male/Female percentage classification. This SCID association with the response may only last for the duration of a particular live event, and may only be relevant to that live event. So, at a live event on a different date, any SCIDs associated with the responses may be newly formed at that particular live event and are thus unique to that particular live event. However, it will be understood that statistical information may be carried over from other live events if the desired statistical data warranted such.

It may also be that the statistical data associated with responses can be shared across a series of concurrent live events. For instance, the SCID corresponding to a 0.6/0.4 Male/Female percentage classification in association with the "A" response may be shared across four different live events taking place on the same night and around the same time. In this embodiment, it may be that the four events all ask a particular question at the same time based on a pre-defined time window for the question. This question asked at all four of the events may also have the "A" response as having the same SCID associated with it so that the different audiences can be evaluated using the same statistical associations. This may be useful when polling audiences at different types of events. If an "A" response is expected to be answered 60% by males, it can be measured against differing audiences in order to determine if that assumption holds true, taking some variation into account. For instance, if the question is asked at a sporting event and 58% of the responses are from males, but when asked at a concert the "A" response is chosen by a population of only 35% males, this provides useful information for particular types of venues.

The visual cue 108 may provide for any arrangement of any of the 40 characters. In some embodiments, the characters used might be in a logical order ("1-2-3", "A-B-C", etc.), or they might be arranged in a random, or seemingly random, order. In some embodiments, the responses displayed on the visual cue 108 may only be used once at a particular live event. For instance, at a live event, if the particular questions asked have used all characters from 1-10 and A-J, it may start using color or symbols exclusively, as 1-10 and A-J have already been used earlier in the event. This allows for certain statistical data to be associated only with particular response characters. However, in other embodiments, a particular question may require certain characters for that question, and thus those characters would always appear with that question.

As provided herein, the 40 fixed characters on the mobile unit screen allows for users of the mobile unit to simply press or tap the particular character that is associated with their desired response. Doing so will cause the response to be transmitted to the local central office 120, along with the timestamp and other information to be transmitted. This thus allows for a one-click user experience. In some embodiments, from the user's perspective, users will only see the characters presented. No text or other information pertaining to the query being displayed on the display cue 108 would be displayed on the mobile units. Thus, each of the mobile units acts as a response system only, encompassing only that aspect of the system. The mobile unit response system would not perform any other function besides accepting a user's response and transmitting that response to the local central office 120.

Figure 22:
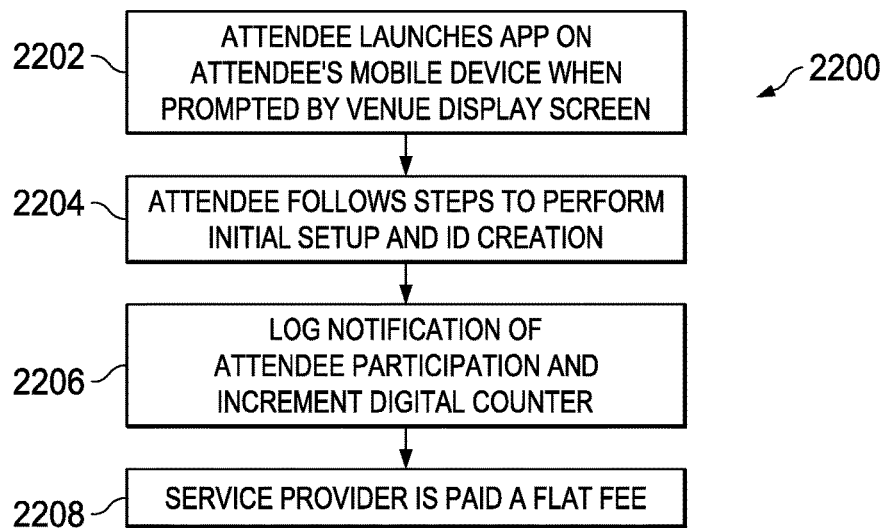
FIG. 22 illustrates a flowchart for a process of tracking attendee participation.

Referring now to FIG. 22, there is illustrated a flowchart of one embodiment of a process for tracking attendee participation at a live event 2200. The process begins at step 2202 when an attendee or user passes through the gate or launches the application on the attendee's mobile unit. The application may be a standalone application, or part of another application's functionality. If part of another application's functionality, such as an official Major League Baseball app, there may be an extra section or tab of the application that the attendee may select to begin using the functionality provided for by the present invention. At step 2204, the attendee follows steps to perform the initial setup and ID creation process as provided herein. This may occur when a user answers an initial query, in addition to providing the user's seat number. This provides for an indication that the attendee is ready and willing to participate in the polling, games, or other activities provided at the venue 102.

At step 2206, upon completion of the initial setup and ID creation process at step 2204, the participation of the attendee is logged. To keep track of the number of attendee's that have chosen to participate, a digital counter may be incremented as well to indicate that another attendee has used the application to participate. In some embodiments, a log might not be kept and only a digital counter used, or in other embodiments only a log would be kept, as desired by the parties involved. The log and/or counter may be saved either permanently or only initially by the local central office 120, and the data would be later transferred to the central remote office 126. This provides a unique advantage over more traditional polling, statistics, or advertising systems because the present invention allows for a verified viewer. In traditional methods, such as an ad banner or ad video at a live event, for example, it is unknown how many people paid attention to the ad. The present invention allows for an exact number of verified viewers or participators to be tracked.

Upon completion of the initial setup and ID creation process and step 2206, at step 2208, a service provider is paid a flat fee for the use of the service. The service provider may be the owner of the central remote office 126, the developer of the application, either developing the standalone app or developing the functionality for the official partner app, or any combination thereof. The service provider would receive the flat fee as compensation for providing the services described herein to the venue 102. The flat fee may be for any value. In some embodiments, the fee may be a low value, such as $5.00, which may be low enough to attract live event venue customers or live entertainment organizations to use the service, while allowing for the revenue stream for the service provider to be substantial if there is high attendee participation. The flat fee would be charged to the live event venue or live entertainment organization for each attendee at a live event that completes step 2204. Preferably, the flat fee would only be paid once per live event per attendee that completes step 2204. This means that the fee would not be paid again when an attendee who has already completed step 2204 participates again during the same live event by answering other polls, participates in games, or other activities. However, other embodiments may allow for a fee to be charged each time an attendee participates at a live event. For example, if 20 polling questions are asked at a live event, the flat fee would be charged for the same attendee 20 times if that attendee participates in every question.

Figure 23:
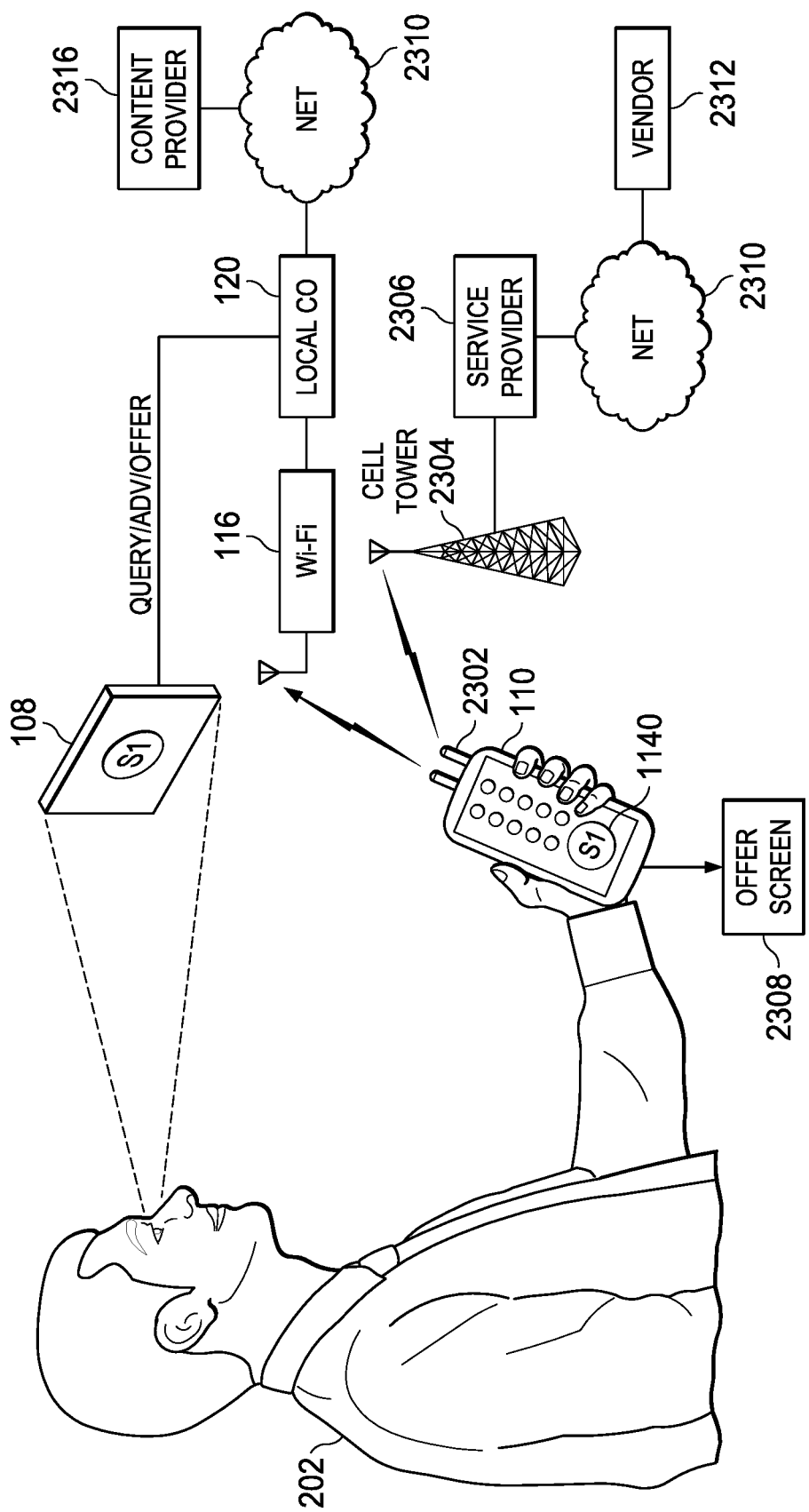
FIG. 23 illustrate a diagrammatic view of an alternate embodiment for offering merchandise for sale.

Referring now to FIG. 23, there is illustrated a diagrammatic view of an operation of the current system for facilitating the purchase of merchandise from outside vendors outside of the overall polling/statistical collection system disclosed hereinabove. As noted hereinabove, the Mobile Unit 110 can be any type of device for facilitating communication with the hotspot 116 or wireless interface 116. However, in most cases, the MU 110 is a smart phone that is registered with a provider that provides a data plan for that particular device. This utilizes a separate radio on a separate antenna 2302 for interfacing with a cell tower 2304 or any other type of data interface. This cell tower is interfaced with a service provider 2306, with which the individual 202 and the device 110 is a registered. Thus, the service provider 2306 will have, due to the fact that the MU 110 is registered with the service provider 2306, information regarding payment option such as credit card and address information with respect to the actual individual 202, in addition to other information about the individual 202. As noted hereinabove, the local CO 120 has no information regarding the MU 110 other than what is provided via inputting the ticket information and running the application. No information is provided with respect to unique information about the particular MU 110 and none is necessary.

In this particular embodiment, the screen 108 displays information to the individual 202 which, for polling operation, elicits some type of response from the individual 202 via the MU 110. In this embodiment, however, what is displayed to the individual 202 for viewing is an offer for merchandise from an outside vendor, the definition of outside vendor meaning a vendor or a party that is outside of current system, i.e., it is not associated with the local CO 120. The vendor could be a merchant that sold goods online or actually be a merchant that was within the confines of the local event within the venue 102. The user is prompted to use one of selection buttons 1140-1144, of which selection buttons 1140 is illustrated in FIG. 23 on the device screen of MU 110. The advertisement might state "the following goods offered for sale at a significant discount of X %-want to take advantage of this offer, please select S1 within the next 10 minutes on your FEVR application." The user or individual 202 would then have 10 minutes, in this example, within which to make the selection. The selection merely requires them to press the button 1140. What would that happen is that a second screen 2308 would be presented on the MU 110 to the individual 202 to complete the transaction external of the local CO 120 and any collection of data or statistics. Everything after this point is unknown to the local CO 120 and whoever controls such.

With this offer screen 2308, the data link is routed through to the service provider and then to the Internet 2310 to provide a link to a vendor 2312. However, the entire offer could be facilitated internal to the MU 110. The primary issue is that information is required to be input to the offer screen 2308 in order to provide information, if needed. It could be that only a single items is being offered with no requirement to input a size or color, etc. In this case, all that is necessary is to push the button 1140 and the transaction is completed with the vendor 2312. However, if additional information is required, the offer screen 2208 allows the individual 202 to interface with the vendor 2312 in order to provide such information. What then occurs is that service provider interfaces with the vendor 2312 in accordance with a prearranged transactional agreement to actually bill the individual 202 through their contractual relationship. This can be facilitated due to the fact that the service provider 2306 has all the information necessary to just provide this payment on the individual's monthly statement.

Although the local CO 120 could provide this query/advertisement/offer from the local database, it also could be retrieved from a content provider 2316 via the Internet 2310 when needed. This allows the content provider 2316, in one example, to actually live stream the advertisement. The main point is that the advertisement is, 1) presented to the individual 202 with predetermined selection button associated there with and, 2) that a time window is provided.

Figure 24:
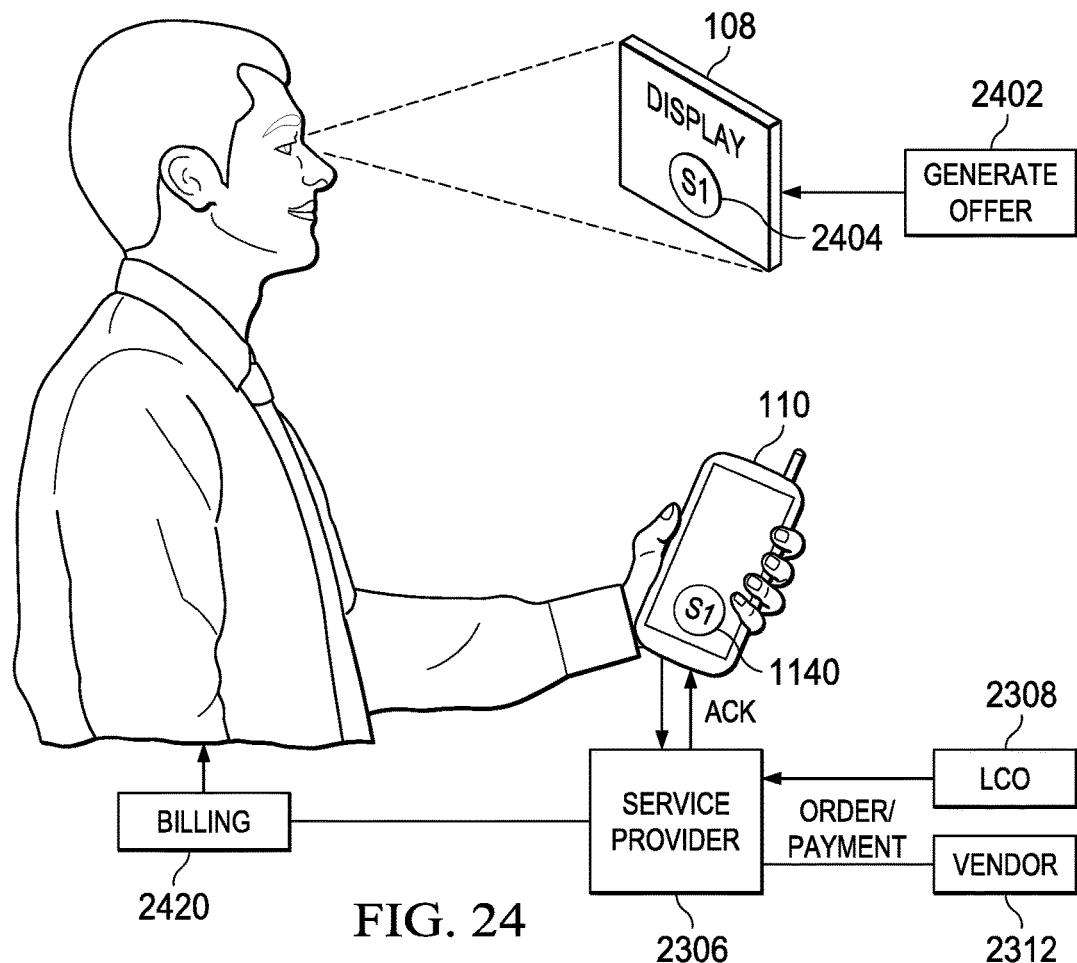
FIG. 24 illustrates a diagrammatic view of the overall system for facilitating the embodiment of FIG. 23.

Referring now to FIG. 24, there is illustrated by diagrammatic view of the overall system flow for facilitating the presentation of the offer and the completion of the transaction, including the billing. A block 2402 represents the generation of the offer which is sent to the display 108 with a selection field 2404 displayed that their one. The MU 110 displays the advertising addition to the selection buttons 1140, in this example, which is then, in accordance with the above noted description, sent to provider 2306. All that is really necessary to send to the provider is, at the minimum, the selection button in addition to some type of location information. With this information, it is possible to allow the service provider or even the vendor to determine which promotional advertisement is associated with and also with you venue 102 it is associated with. To facilitate this, some kind of location information is provided via a block 2408. Since there is no two-way communication with the local CO 120, the information that the MU 110 has is GPS information, SSID information of the wireless hotspots, and a ticket number. The ticket number, if it is in the form of a seat number, section number, and room number, may not be unique to any particular system, as multiple venues might share the same seat number. However, it may be that there is a unique ticket number that is unique across all venues, and this may actually define the location. If not, then GPS information could be provided to define the location of the MU 110 at the time of the generated response. This provides the actual physical location of the MU 110, and this just needs to be correlated with a known physical location of a particular venue. Thus, this promotional advertisement or offer might be displayed at multiple venues throughout the country. For example, on any given weekend, there may be multiple football games sponsored by the NFL®, and the promotional offer or advertisement, since it may only be presented during timeouts, halftime events, etc., would not be synchronized across multiple games and multiple channels. In this event, the vendor would have to know the physical location of the event in order to determine which venue this was associated with in order to verify information. Additionally, a particular vendor or program operating outside of the local CO 120 would have to be aware of the time in which it was presented. Thus, the local CO 120 would have to inform the vendor of the time in which the promotional advertisement was actually displayed, and this could be coordinated with the generation of this response via the button 1140.

Thus, the service provider 2306 would receive both the information recording the response that was sent, i.e., an indication that the button S1 was pressed, the location information, and also the time information in the form of a timestamp. This information is then routed to the vendor 2312. The vendor 2312 has a contractual relationship with the service provider 2306 in order to allow the service provider 2206 to bill the individual 202 through the contractual relationship it has therewith. This is represented by a block 2420.

Figure 25:
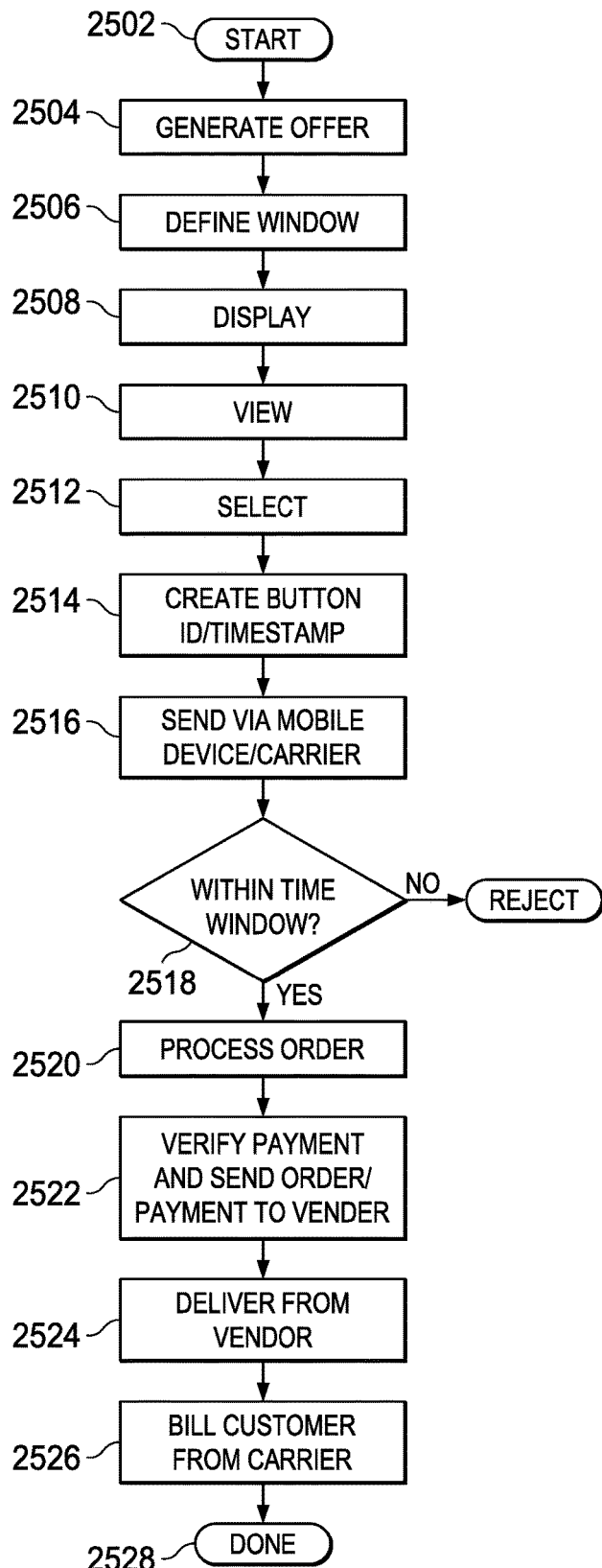
FIG. 25 illustrates a flowchart for the overall operation of the system of FIG. 23.

Referring now to FIG. 25, there is illustrated a flowchart for the overall operation of the merchandising feature area. This is initiated at a block 2502 and then proceeds to a block 2504 or in order to generate the offer. This requires the definition of a time window, as indicated by block 2506. This is then displayed, as indicated by a block 2508, with the appropriate response button that must be selected in order to take advantage of this particular promotional offer. The program then flows to block 2510 wherein the individual 202 views the offer, and a selection is made, as indicated by block 2512. At this point, a button ID with a timestamp is created, this button ID not being for the purpose of the polling or statistical operation of the local CO 120. It is merely provided in order to encode within the button ID the information about the button unique to the application, i.e., in this case it would encode the underlying code for the button 1140. This is then combined with a timestamp and sent via the overriding offer application, which is associated with the screen 2308, to the provider 2306 in order to interface with the vendor 2312 or to just send the information to vendor 2312. This is indicated at a block 2514. The program then flows to block 2516, wherein this is sent via the MU 110 to the carrier and then to the 2312. At this time, a determination must be made as to whether a timestamp associated there with, in addition to location information, indicates that the selection was made within the time window, this indicated by decision block 2518. If not, this is rejected. If so, then the overall order is processed, as indicated by a function block 2520. This process includes verifying payment and then sending order/payment to the vendor, as indicated by block 2522. The vendor will then deliver the product as indicated by block 2524, and the customer is billed by the provider, as indicated by block 2526. The program then proceeds to a Done block 2528.

Figure 26:
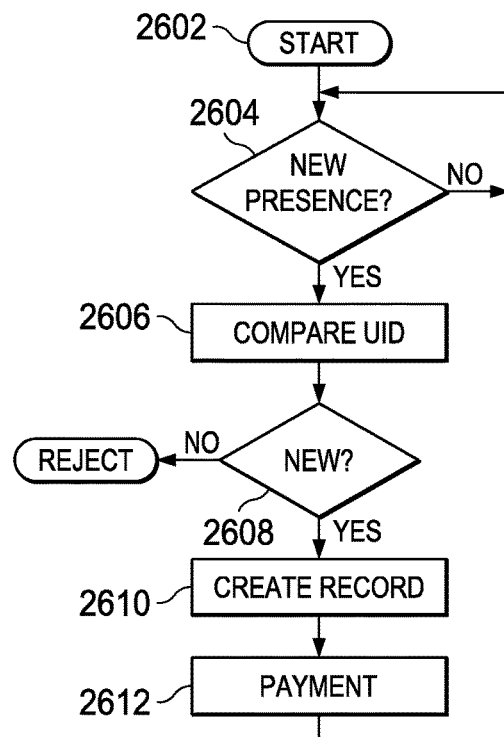
FIG. 26 illustrates a flowchart for ensuring that only a single seat is associated with a unique ID.

Referring now to FIG. 26, there is illustrated a flowchart depicting the operation of ensuring that only a single UID is associated with a single seat. The reason for this is that, from an integrity standpoint, an advertiser wants to have statistics that cannot be manipulated. One issue might be that another entity could manipulate the statistics by entering other UIDs into the system due to the fact that the timestamp makes it more unique. By requiring each UID to have a unique seat number, the situation wherein a second application has the wrong seat number entered therein will result in a rejection. Even if first UID assigned to that seat number is incorrect, UID will be rejected when the individual 202 with the correct ticket numbers tries to enter in their seat number. Since it had already been incorrectly entered and a UID registered with that seat number, the new one will be rejected. This will be an error, but it will be tolerated. The important thing is that an advertiser or somebody interested in statistics about the crowd can be ensured that, for a venue having associated therewith 10,000 tickets, there will be no more than 10,000 UIDs generated. Even if only 8000 attendees registered their UIDs, the advertiser can be assured that these are in fact associated with the "eyes" that they desire to be directed at their particular advertisements, etc.

The program is initiated at a block 2602 and then proceeds to decision block 2604 to determine if there is a new presence, i.e., a new MU 110 is entered at the event boundaries, and a ticket has been utilized in order to enter the unique information from the ticket and create the UID. UID is sent to the system, the local CO 120 and compared to the already existing UIDs, as indicated by block 2606. The program then flows to a decision block 2608 to determine if this newly received UID is unique to the system. If not, this indicates that it is a duplicate for some reason, and it is rejected. If so, the program flows to a function block 2610 New Record, as described hereinabove and then to a block 2612 in order to register payment, as described hereinabove.

Figure 27:
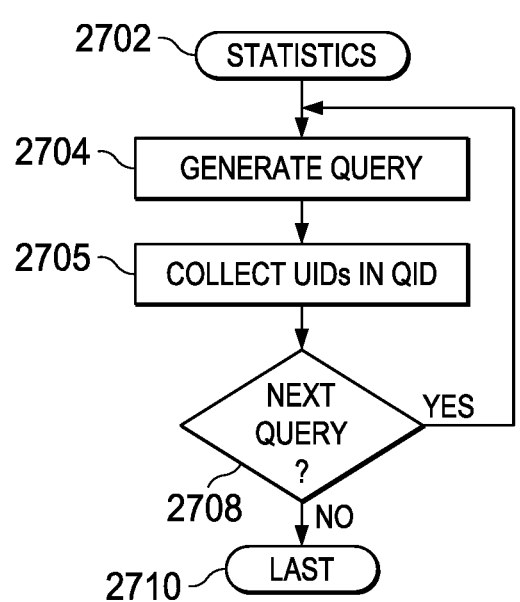
FIG. 27 illustrates a flowchart for analyzing and collecting statistics via the crowd-based response input.

FIG. 27 illustrates a flowchart depicting the overall operation of collecting statistics via all of the responses received in the crowd-based response system, which is initiated at a block 2702. The program then flows to a function block 2704 in order to generate the query. As noted hereinabove, the query is actually designed such that it has embedded therein statistical information that can be derived from a particular response. For example, press "1" for female and "2" for male. This particular key, i.e., that for the "1," is for that query during that time and is statistically related to the gender female. Of course, studies of individuals responding to that question may indicate that the 80% will actually be female. Thus, a statistical certainty of 80% can be associated with that particular "1" button for that particular query during that particular time window. That will accordingly be mapped to an SCID for that particular statistical certainty of female. It may be at another query was designed such that the button "C" was mapped to that SCID and, for that query in that time window, the button "C" is associated with the statistical certainty of 80% female. After generation of the query, the various UIDs responding thereto, as indicated by a block 2705, will be collected and the various data records updated. As noted hereinabove, a particular response can be associated with multiple SCIDs for a given button.

After all of the UIDs are collected and mapped to QIDs, CIDs, and SCIDs, the program flows to a decision block 2708 in order to determine if another query is in the queue. If so, the program backs around to the input of the block 2708, and, if not, the program flows to a block 2710 indicating that this is a last query.

Figure 28:
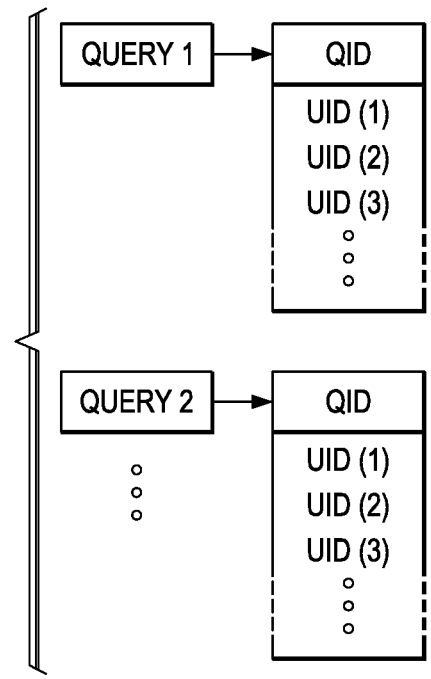
FIG. 28 illustrates a diagrammatic view of the relationship between the query and the UID.

Referring now to FIG. 28, there is illustrated a diagrammatic view of how a query is mapped to a QID, for example. When the query is output, as noted hereinabove, a time window is defined which is uniquely associated with that query. The response is resolved down to the UID, the timestamp and the RID. In the QID, all of the UIDs responding will be collected. Thus, all that is necessary is to look at the QID, which is unique as to a time window. For example, if there were two queries that were basically identical, and they were generated at different times, they would actually have a different QID, as each is unique with respect to its time window. It may be that a particular individual associated with an MU 110 presses the button more than once. This would provide the same UID in the particular QID record more than once. During the analysis, this can be discriminated. If it was desirable to see how many unique UIDs responded to a particular query to see how many people's "eyes on the screen" there were, then all that would be necessary was to determine the number of unique UIDs that responded. If, on the other hand, it was desirable to see how many times a response was provided to a particular query, the QID for that query be analyzed for the total responses including multiple responses from associated UID. This is illustrated in FIG. 23 in the form of two different queries associated with two different QIDs.

Figure 29:
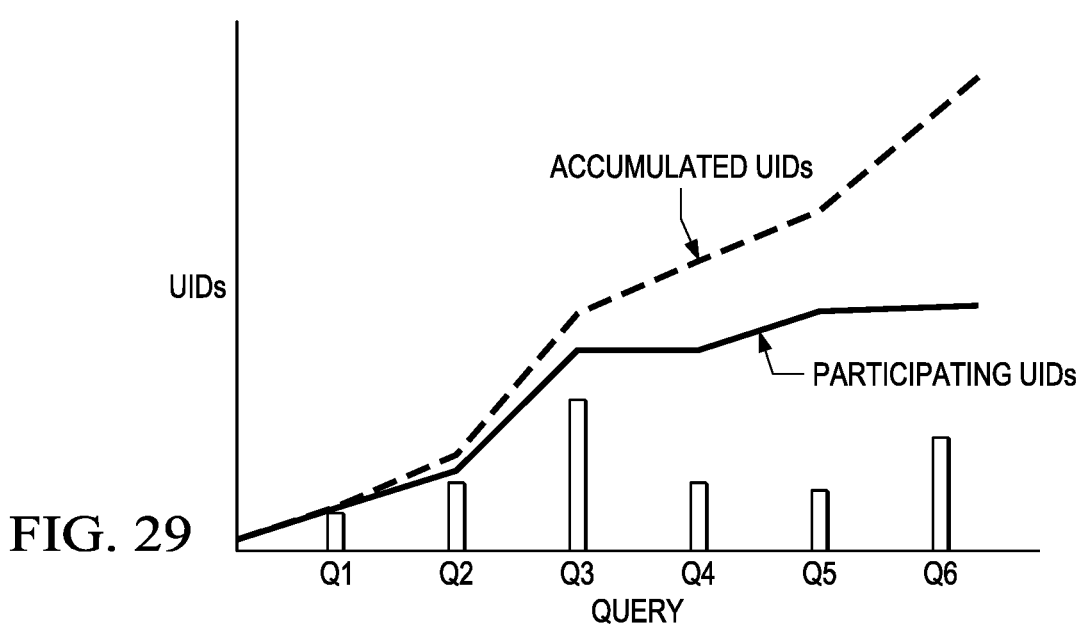
FIG. 29 illustrates the overall response that can be collected of that particular query.

Referring now to FIG. 29, there is illustrated a diagrammatic view of an example of an analysis with respect to these queries that are presented in each query. They can be seen from this graph that initially, the first query had a low number of responses and, as the event wore on, certain queries have higher level of responses as opposed to other queries. These are total responses to a particular given query. The first bar chart illustrates the total number of responses for a given query. An additional analysis can accumulate the total number of responses by accumulating UIDs over the time of the event. Additionally, an analysis can be performed to determine the actual participating UIDs. It may be that certain MUs 110 participate in the response-based operation more than others. There could be, for example, 30,000 attendees, of which 10,000 are registered with an associated UID. By knowing the number of total registered MUs 110, a determination can be made as to what percentage at any given time is actually participating, and also an analysis can be made as to the distribution of participation by the registered users. There may be a certain portion that responds to every query, a certain portion that only responds to 50% of queries, a certain portion that responds only 25%, and a portion that never responds. This can be important information for an advertiser/promoter. Additionally, since the seat number is known from the UID itself, as this is embedded information therein, it is possible for the system to actually map responses to certain areas of the live event. For example, suppose that the event were a baseball game. It is well-known that seats behind home plate are the most expensive seats, and the bleachers are the least expensive seats. It may be that certain queries are responded to more heavily by attendees in the bleacher seats as opposed to those in the behind home plate seats. A statistical certainty may actually be placed upon a particular seat with respect to income, for example. Thus, if it is determined that at certain times during the event that more responses are being received from UIDs associated with behind home plate seats, it is possible to actually tailor the queries during those times for those particular attendees. The analysis can be performed real-time to actually change the subject matter of the queries that are presented.

Referring now to FIG. 30, there is illustrated a simplified diagram of the mapping of a query to an SCID. Each query, the QID and the CID, can be mapped to a particular SCID. This is defined in the design of the particular query. The SCID is associated with a statistical certainty such that any choice can be associated with any SCID. As noted hereinabove, a query is defined with anywhere from one to multiple choices, each choice associated with a particular button. That button will be associated with one or more SCIDs. These, again, are predetermined statistical certainties that are defined in the context of the particular query. Illustrated are multiple queries. The first query, query 1, has two choices, a choice 3002 and a choice 3003, meaning that there are two buttons associated with that query to allow the user to make two choices. It is noted that a choice may also require the pressing of multiple buttons and not just a single button. Thus, the combination of buttons would constitute a choice. The first choice 3002 is associated with an SCID 3006, an SCID 3008 and an SCID 3010. Each of these SIDs 3006-3010 have a different statistical certainty associated with a different classification or CID, such as gender, political affiliation, ethnicity, etc. The second choice 3003 is associated with an SID 3012, this being a different statistical certainty for a different classification. There is provided a second query, query 2, that is illustrated as having a choice, a single choice, that will be associated with the SCID 3006, the SCID 3010 and the SCID 3012. A last query, query (m), has three separate choices, one associated with SCID 3006, one associated with SCID 3008, and one associated with SCID 3012. This association is, again, defined in the design and the generation of the query. By having some knowledge of the particular query in the context thereof, a designer of the query can determine statistical relationships between that question, the response elicited and the statistical certainty from that response. Again, the example of just selecting one of two choices, one for female and one for male, will be easy to design, as it will be provided an SCID for male and an SCID for female. If there were a query asking if you are an out-of-town visitor, that would be a statistical certainty for a nonresident. A query for information regarding "your country of origin" could provide five responses via five separate choice buttons for Europe, Asia, South America or Canada, and these four choices would provide a statistical certainty for four different SCIDs, each associated with one of those choices. In this query, for example, each button that is provided at that time for that query has a defined statistical relationship as a result of being associated with a particular SCID, that statistical relationship defined by the properties of that associated SCID.

Figure 31:
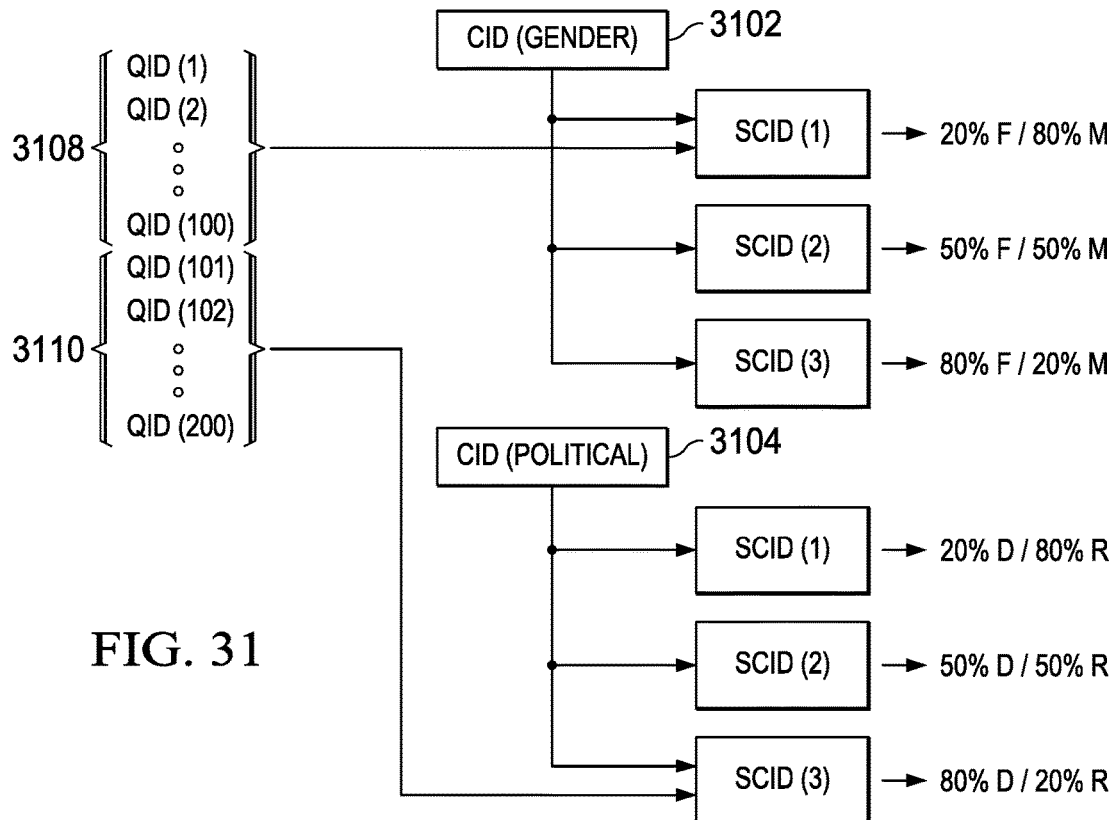
FIG. 31 illustrates a detailed example of a mapping of various QIDs to SCIDs.

Referring now to FIG. 31, there is illustrated a diagrammatic view of one example of the design of a collection of statistical data. In this example, there are provided two CIDs 3102 and 3104, the CID 3102 associated with gender, and the CID 3104 associated with political affiliation. There are associated with the CID 3102 three different SCIDs, one for a ratio of 20% female/80% male, one for 50% female/50% male, and one for a ratio 80% female and 20% female. The CID 3104 is associated with three SCIDs, one for 20% Democrat/80% Republican, 50% Democrat/50% Republican, and 80% Democrat/20% Republican. The designer can define for a particular query which statistical relationship is applicable and select the closest SCID that has embedded therein the statistical certainty. Thereafter, for any given query, each query or number of queries can be associated with that particular SCID. For example, there is a group 3108 of QIDs that are associated with the SCID having a ratio of 20% female/80% male. There is another group of QIDs 3110 having in Association with the SCID for 80% Democrat and 20% Republican. It may be that certain QID in group 3108 are also QID in group 3110. Just the mere response to the QID and, of course, the particular response button associated therewith, it being noted that there may only be a single response, will result in UID making that response being populated into the record for a particular SCID. When analyzing a particular SCID over multiple queries, a determination can be made as to how many unique UIDs responded thereto or the total number of responses. This of course must account for multiple taps and the such. This can be handled in the software response for any query such that not all responses from a single MU 110 are recorded-only a single recording of a response during a given time window will be recorded.

Referring now to FIG. 32, there is illustrated a diagrammatic view of the analysis of one group of SCID associated with the gender CID 3202. There are provided eight SCIDs associated with the gender CID 3202, ranging from 0.1/0.9 through 0.9/0.1 as a ratio of female/male. This is a binning process wherein UIDs responding thereto will be binned therein for all queries. Of course, each SCID is mapped to a particular QID such that any QID can be analyzed for the particular SCIDs that are associated therewith. In the chart, it is illustrated that a distribution of binned UIDs are illustrated, it being noted that there are more females than males in the overall responders. This graph does not show or illustrate the number of queries that were responded to; rather, it illustrates the binning operation of the actual responses that, through the design of the queries.

Figure 33:
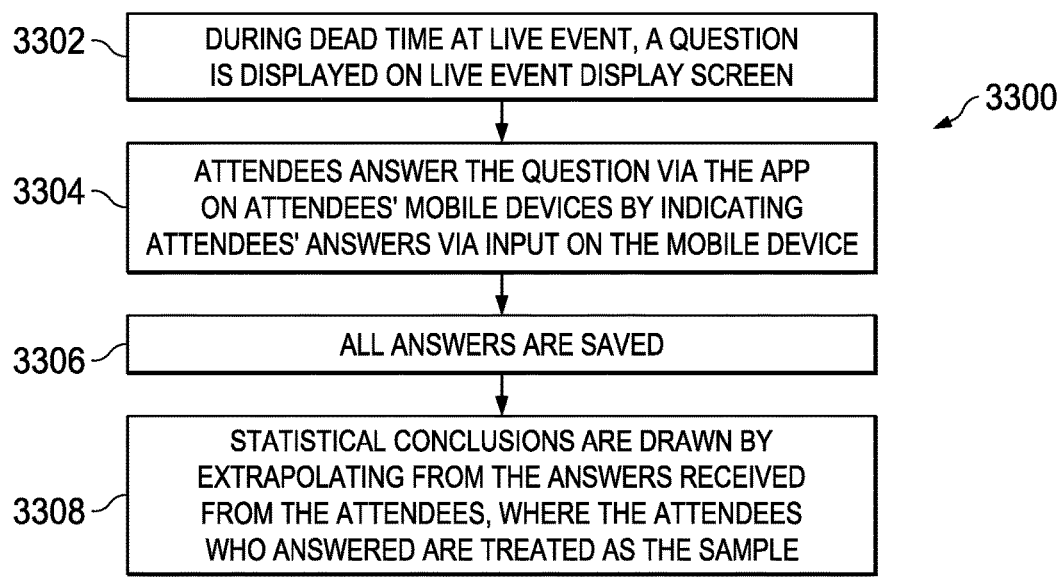
FIG. 33 illustrates a flowchart depicting one embodiment of a process for extrapolating from statistical data gathered from mobile devices at a live event.

Referring now to FIG. 33, there is illustrated a flowchart depicting one embodiment of a process for extrapolating from statistical data gathered from mobile devices at a live event 3300. The process begins at step 3302 where, during dead time at the live event, a polling question is displayed on a venue display screen. The displayed question may be on a large variety of topics, such as consumer preferences and political questions. For instance, a question may ask "what type of car do you drive?", with options listed for "compact car," "full-size car," "truck," "SUV," and "other." The user would select their answer by pressing a button on the screen of the mobile device that corresponds to the option presented on the venue display screen 108. On the other hand, a question such as "are you in favor of gun control?" with the options "yes," "no," and "undecided" presented. It will be appreciated that statistical data may also be gathered from activities other than polling questions.

Similarly, questions to assess merchantability may also be presented on the venue display screen. Merchantability for the purposes of the present invention includes gauging whether consumers would buy or endorse a particular product. For example, a question may be presented that asks "would you buy Pepsi or Coke?" or "would you buy a Chevy?". The question may be accompanied by other media, such as showing an ad for Pepsi following by an ad for Coca Cola, and then displaying the question. In another example, a live concert event may ask the audience, after the first two bands have played and while the headlining act is setting up, which of the first two opening bands the audience prefers, or for which of the two bands the audience would buy a record. Similarly, this may be done by playing music videos of bands unrelated to those playing at the concert, followed by a question regarding whether the audience would by an album for the bands, and for which one. In yet another example, a band at a concert may ask the audience to listen to a few melody selections, which the band would play live for the audience, and then present the audience with a question regarding which of the melodies most resonates with the audience. This would provide useful data for the band or record label in determining what types of melodies the general audience is most attracted to, and then base future songs on that preference. It will be understood that these are just a few examples, and the same concepts could be applied to all live events and within all industries.

At step 3306, all answers from attendees who participated in step 3304 is saved, either to the local central office 120 or the central remote office 126. At step 3308, statistical conclusions are drawn by extrapolating from the answers received from the attendees. The attendees are essentially serving as the sample for the statistical analysis. However, unlike most studies or focus groups, where you have a small sample size and extrapolation is performed based on that small sample, a live event such as a sports or music event can potentially have tens of thousands of people, or even more. Thus, this provides for more accurate conclusions to be drawn. Further, the data is collected from people who may already be interested in the subject-matter. For instance, an audience at a concert that is being asked for their preferences in music are exactly the type of people a record label wants to hear from; the people who pay to attend concerts. Ordinary focus groups often lack the core or target audience, and thus conclusions drawn from such data can lead to erroneous results. The results of the statistical conclusion may be displayed at the live event for entertainment purposes wherein people can measure their response against what the most popular response was, for example. The results may also only be viewed or analyzed by interested parties.

This process also allows for statistical conclusions to be based on the type of audience, or on a population generally, depending on the desired use of the data. For example, data collected from a live baseball game where the question "what type of car do you drive?" might be applied to baseball fans. So, if a majority of fans selected "truck" as their answer, a conclusion could be drawn that baseball fans are more likely to buy trucks than other types of vehicles. Similarly, if the same question is asked at an opera house, and a majority of the audience selected "full-size car," a conclusion could be drawn that opera fans are more likely to by full-size cars than other types of cars.

In addition, this process allows for attendees to measure themselves against other attendees in some embodiments. After an attendee has answered a question, the results may be compiled and re-displayed for the audience to view how their response measures against the audience as a whole. It will be appreciated that this has many applications. For instance, if a majority of the women in the audience answered a question a particular way, while a majority of the men in the same audience answered a question in a different way, this may be compiled and re-displayed for the audience. This allows for the audience to see how gender affected the results, and can measure their answer against the majority opinions. This creates an interest in answering the question, as there may be a natural curiosity to see how one's answer measures up to the results. The same method could be applied to merchantability questions, such as re-displaying the results of the question "would you buy Pepsi or Coke?" so that an audience member can see how his or her answer measures against the results. For instance, if someone chose the response option for "Coke," and the results are re-displayed to show that 90% of those who answered chose "Pepsi," the person who chose "Coke" can see that they are in the minority.

This system may also be extended to questions that elicit more emotional responses. These types of questions would relate to how people feel about a particular topic. For instance, the question might state "how do you feel about the government?" or "how do you feel about the neighborhood you live in?" with appropriate responses ranging from positive to negative to even fearful answers. The statistics regarding these answers would then be displayed to the users. This process may also be enveloped in a game. For instance, it might ask one section of the crowd to press one response key as fast as they can, while another section presses a different response key. The results would then be displayed, showing how the sections compared.

The displayed results may be in a variety of forms, bar graphs, pie charts, percentage, ratios, or any other visual representation of data.

Figure 34:
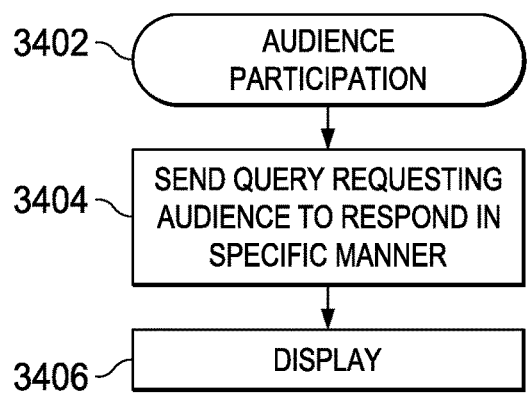
FIG. 34 illustrates an overall flowchart of the audience participation function.

Referring now to FIG. 34, there is illustrated a flowchart depicting the overall audience participation concept, which is initiated at a block 3402. Program then proceeds to a block 3404 to send the query or the prompt requesting audience participation in the form of a response in a specific manner. The program then flows to a function block 3406 to display the results. These results are real time results.

Figure 35:
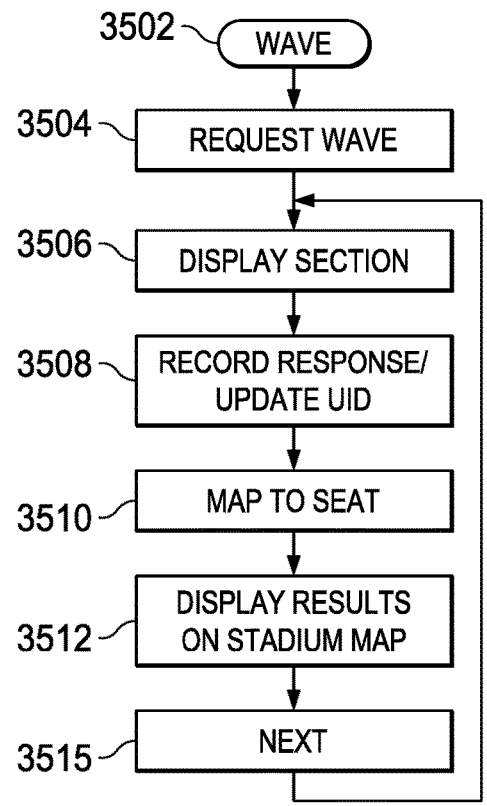
FIG. 35 illustrates a flowchart for the wave example of audience participation.

Referring now to FIG. 35, there is illustrated a flowchart for one example, that of the Wave. This is initiated at a block 3502 and then proceeds to a block 3504 to phrase the prompt or request on the display 108 as a request for the Wave. The program then flows to a function block 3506 to display a particular section. The program then flows to a block 3508 in order to record the response and update the UID. Since every response is in the form of the QID for that particular query, just by looking at a particular QID, the QIDs populating such can be determined. For this application, only a single "tap" of the key will be accepted. If, for some reason, an individual taps the key multiple times, this would actually be recorded in the QID during that appropriate time window as a valid input. This might be used for some statistical analysis, but for the purpose of this application, all that is necessary is to know how many UIDs have been recorded in that QID record. Each of these UIDs can then be mapped to seats, as indicated by a function block 3510. This is facilitated by the fact that these physical location is actually provided as a part of the UID. This can be utilized for such things as delivering prizes, for example, but in this situation, all that is required is to map the seat number onto the display. It may be that UIDs for other sections also responded, and these may or may not be displayed. The results displayed are illustrated in a function block 3512. The program then flows to block 3515 in order to select the next section and then back to the input of function block 3506. As each section is displayed, the results are then displayed in real time. Since this is real time, the time window can be very short period. Thus, after the time period has expired for particular section, no more UIDs for that section will be recorded. Thus, the time window is basically a "wide-open" time window that is only for the purpose of displaying results. When the section number is up there, the time window is open only for that section and those associated UIDs. Alternatively, all UIDs can be displayed that respond, and all that is necessary is to continually display a prompt that moved from section to section and then display the results of the MUs 110 that responded via their associated UID.

Figure 36:
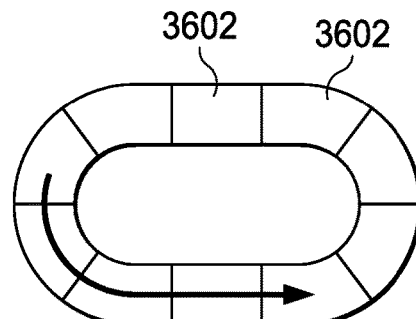
FIG. 36 illustrates a diagrammatic view of the display for the wave response.

Referring now to FIG. 36, there is illustrated a diagrammatic view of the overall display of the venue, illustrating a plurality of sections 3602. As the UIDs are collected, the particular section can either be completely eliminated or the shade associated with that particular section increases a function of the number of UIDs that respond. This allows the actual individuals to view the response and asked to participate more. Additionally, by analyzing the number of UIDs associated with that particular QID, it will provide to the analyst information regarding which sections have people that are actually more participatory than others, among other information.

Figure 37:
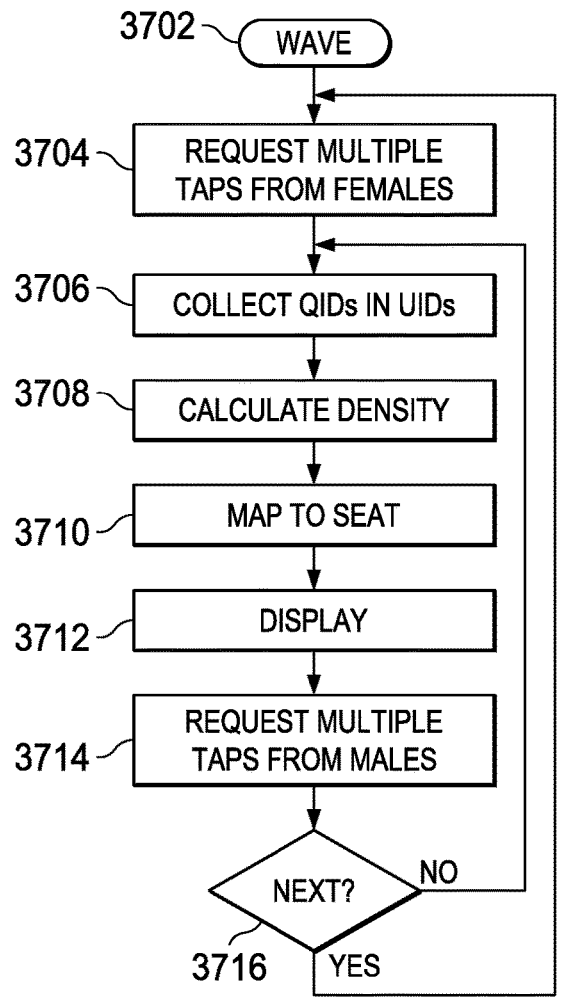
FIG. 37 illustrates a flowchart for the noise example of audience participation.

Referring now to FIG. 37, there is illustrated a flowchart for the "noise" interactive operation. This is initiated at a block 3702 and proceeds to a block 3704 in order to request multiple taps from females, in one example. The program then flows to a function block 3706 in order to collect in the QID for that query/prompt all of the UIDs responding thereto. This particular query might also have an SCID that is associated with gender. Suppose, for example, that the button that they requested to be pushed for this particular operation was the "A" button. At this point in time, that particular button is statistically linked to an SCID that has been predetermined to have a certain statistical relationship to the individual pressing a button being a female. As noted hereinabove, that is probably not 100%. It may be 90% due to the fact that certain people did not read the prompt correctly or they do not care. In any event, an SCID for 10% male/90% female could be associated with that particular button.

At this point, the overall density for the responses in total just looking at the QID can be determined, as indicated by a block 3708. The program then flows to a function block 3710 to map this to the seats in the venue 102 and then to a block 3712 to display the results. It could be that the more "taps" that a particular MU 110 is associated with, the higher the density for that particular seat will be. An average of the overall density in a particular region about all the seats can be determined or the actual seat itself can be made brighter, for example, due to the density of taps associated there with.

A new query is then generated requesting multiple taps from males, as indicated by block 3714. Again, this is a QID that is unique as opposed to the QID for requesting multiple taps from females. The program then flows to a decision block 3716 to determine if this is to go back around to collect the UIDs for this QID and, if so, the program flows to the block 3706 to collect UIDs for this particular QID associated with this particular query/prompt. This continues until it's finished and then, at the decision block 3716, it flips back over to the input of function block 3704 to request the multiple taps from the females in the associated query therefore. Each of these queries associated with that particular QID has a time window associated therewith, of course, as this makes a QID. Thus, for this purpose, a second QID could be generated each time a new query is generated, or the program could merely create the same QID with a different time window. However, for analysts, it will be desirable to have a separate QID for each time window such that, for example, if there were 10 requests for females to respond and 10 request for males to respond, there would actually be 20 QIDs created in the system. These would all be queued up for output at a particular time. Overall, this could actually be an automatic operation.

Figure 38:
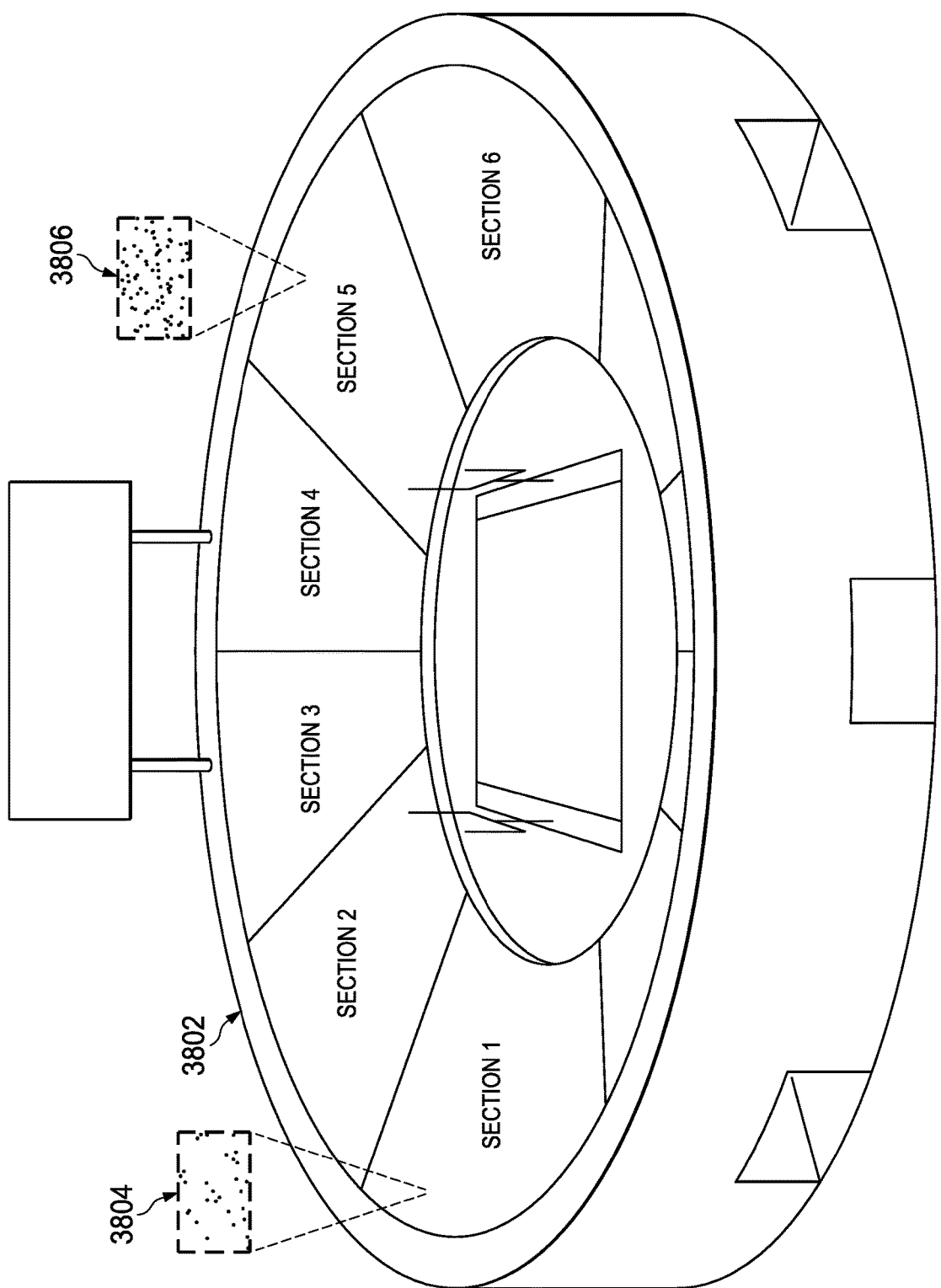
FIG. 38 illustrates a diagrammatic view of the display for the noise audience participation response.

Referring now to FIG. 38, there is illustrated a diagrammatic view of a venue display 3802 displaying various sections. There are illustrated in two detailed section views 3804 and 3806 two sections. In the sections, there are provided density distributions for the responses. As noted hereinabove, this could actually be a heavy shading. However, with knowledge of the UIDs and their seat location, any type of display operation can be provided.

Figure 39:
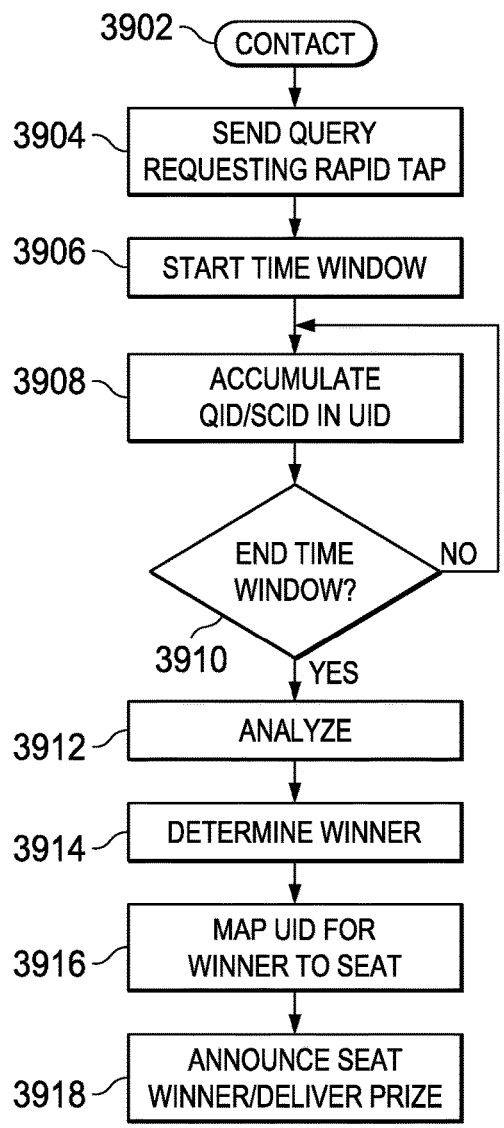
FIG. 39 illustrates a flowchart for the operation of running a contest.

Referring now to FIG. 39, there is illustrated a flowchart for a contest. This is initiated at a block 3902 and then proceeds to a block 3904 to generate and send a query requesting a rapid tap with some type of incentive for doing such. For example, the incentive could be that a promotional T-shirt will be given to the individual or individuals that could tap the fastest on their MU 110. Program then proceeds to a block 3906 in order to start a time window for the overall promotion and then to a function block 3908 to accumulate the various information in the QID and in the SCID, in addition to accumulating such in the UID. At this point, all of the database is updated in the various records. If all that was desired was to determine which MU 110 had the most taps, it would only be necessary to determine how many times the QID for that particular query was updated by the UID, which is reflected in the pointer back to the UID, as a UID record has a record of each QID that it responded to. If a time window were 10 seconds, a countdown timer on the prompting display might show the countdown, but the time window would not necessarily be exactly synchronized to that countdown timer. At the end of time, the number of times that the QID was responded to by a particular UID can be determined and that particular seat number declared a winner. The end of the time window is indicated by a decision block 3910, at which time an analysis is made of the data at a block 3912 and in the winner determined at a block 3914. At this point, the actual UID can be mapped for the winner to the seat, as indicated by block 3916 and then some type of announcement of that result indicated at a block 3918. The result could be that a promotional T-shirt is delivered to multiple seats surpassing a threshold, delivered to a single seat, or an announcement made that for a particular seat, the presentation of your ticket, would allow the individual to collect their prize at later time. In addition, it could be that a raffle was provided of an automobile, for example. That automobile could be advertised as one that would be given away at the end of the event, and based upon responses the automobile manufacture would provide this promotion and utilize the number of taps to place individuals into the raffle, or they could just merely be a response that places them in there. This response would be for the purpose of, for example, collecting statistics from the particular crowd. This would allow a large number of seats, take, for example, 8000 responders out of the 10,000 attendee event to be placed into the raffle. This would be an incentive for people to pay attention to the screen and, further, it would actually encourage people to actually activate their applications and enter crowd based response system.

In the event that MU 110 is not entered into the crowd based response system due to the fact that they did not register, it is possible to allow them to register. This would be a prompt that would actually ask people to turn on their application and respond to a particular response request in a certain manner, as entering whether they are male or female, i.e., pressing button "D" or "B." the preferable way, of course, is to register when they enter the stadium. The reason for this is that, at this time, registration would require another payment, and this payment may be entered at the middle of the overall event. This might be treated different by the overall financial arrangement with the event planners.

Figure 40:
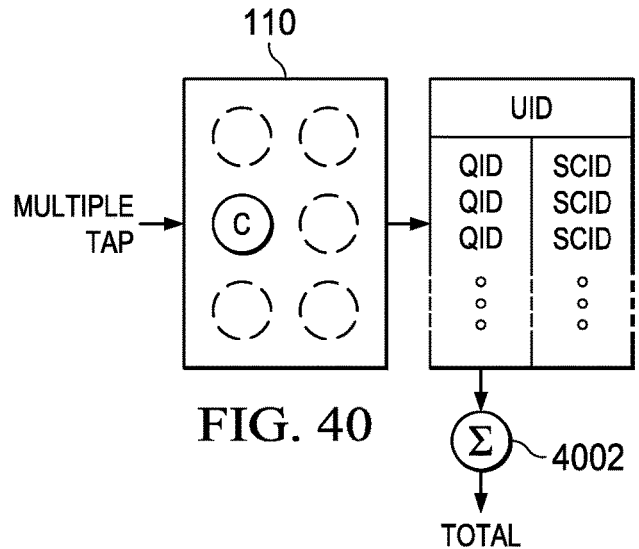
FIG. 40 illustrates a diagrammatic view of populating the UID record for a particular mobile unit.

Referring now to the FIG. 40, there is illustrated a diagrammatic view of the overall "tapping" response. The MU 110 is illustrated as having one button that is the focus of the particular query or promotional offer, this requesting the individual 202 to select this particular button, in this case, the "C" button. This will result in the particular UID for that particular MU 110 to collect both QID occurrences and SCID occurrences. Again, this particular request could be for females to tap, and the SCID for that would be different than a request requesting all males to respond. Any one of these can be summed, as indicated by a block 4002, in order to provide a total, in one example. As noted hereinabove, any type of analysis can be made upon this particular UID. Here, the issue is to determine how many times a particular UID has been associated with a QID within the time window of the QID.

Although the preferred embodiment has been described in detail, it should be understood that various changes, substitutions and alterations can be made therein without departing from the spirit and scope of the invention as defined by the appended claims.

What is claimed is:

1. A method for interacting with audience members in an event, wherein the event has a finite number of participating attendees selected from attendees of the event, each of the participating attendees having available thereto a unique identifier, comprising the steps of:
   for each participating attendee, creating a unique ID (UID) on a mobile wireless device (MWD) by the steps of:
   detecting a presence of the MWD by a beacon device;
   generating by the beacon device a signal configured for detection by the MWD;
   launching an application stored on the MWD in response to a detection of the signal;
   inputting to the MWD one of the unique identifiers; and
   combining the input one of the unique identifiers with a UID time stamp to provide the UID comprised of a unique identifier portion and a UID time stamp portion so as to distinguish two different UIDs having a duplicate unique identifier portion, resulting in a verified UID;
   receiving with a server on a first wireless channel communications from the MWD of each participating attendee; and
   registering the verified UID of each participating attendee at a venue of the event.

2. The method of claim 1, further comprising:
   generating at the server a visual query;
   displaying on a physical display at the event the visual query;
   displaying on the MWD of each participating attendee response indicators;
   receiving at the server from each participating attendee a response, each response resulting from one of the participating attendees selecting one of the response indicators, to the visual query over the first wireless channel;
   storing in a database on the server the received response for each participating attendee in association with the displayed visual query;
   associating the respective received response for reach participating attendee with the respective verified UIDs;
   creating a query ID (QID) associated with the displayed visual query; and
   creating respective response time stamp indicating the respective times at which the respective responses were received by the server.

3. The method of claim 2, further comprising:
   creating a verified UID data record for each verified UID, each verified UID data record including:
   the respective UID,
   the QID,
   the respective received response, and
   the respective response time stamp;
   creating a QID data record for the QID, the QID data record including:
   the QID;
   each of the respective received responses,
   each respective UID, and
   each respective response time stamp;
   performing statistical analysis on the QID data record; and
   displaying, on the physical display at the event, information regarding the statistical analysis of the QID data record.

4. The method of claim 2, wherein the response indicators comprise alphabetic symbols or numeric symbols.

5. The method of claim 2, wherein the response indicators comprise symbols of differing colors.

6. The method of claim 2, wherein receiving at the server the response includes receiving a timestamp associated with the response.

7. The method of claim 2, wherein receiving at the server the response includes receiving the response within a defined time window.

8. The method of claim 2, further comprising associating each respective received response with statistical information related to an attendee classification.

9. The method of claim 2, further comprising assigning each respective verified UID to a statistical category based on the respective received response and the displayed visual query.

10. The method of claim 2, wherein the verified UID data record also includes statistical information that is related to an attendee classification and that is based on the received response.

11. The method of claim 1, wherein each unique identifier is a respective fixed location associated with the venue.

12. The method of claim 11, wherein each respective fixed location is a defined seat in a closed venue having a seat identifier as the location.

13. The method of claim 1, wherein registering each respective verified UID comprises recognizing each respective MWD at a predetermined and fixed location within the venue.

14. The method of claim 13, wherein recognizing each respective MWD comprises a scan of the MWD in a vicinity of the predetermined and fixed location.

15. The method of claim 1, wherein registering each respective verified UID comprises responding to a request for registration by transmitting the respective verified UID to a server over the first wireless channel.

16. A system for interacting with audience members in an event, wherein the event has a finite number of potential attendees, each of the potential attendees having available thereto a unique identifier, the system comprising:
   a first wireless channel;
   a mobile wireless device (MWD) for each participating attendee, each respective MWD configured to display response indicators and to communicate responses over the first wireless channel;
   a unique ID (UID) for each participating attendee, created on the respective MWD, each UID comprising:

a unique identifier available to the respective attendee in association with the associated MWD for that attendee to define a portion of the UID; and a time stamp as a second portion of the UID;

a beacon device configured to:

detect a presence of each MWD, generate a signal configured for detection by each MWD, wherein detection of the signal launches an application stored on each MWD, and interface the MWD with a server to allow the MWD to transmit the associated UID to the server for verification as a verified UID; and the server configured to filter received UIDs into verified UIDs, such that any UID having an identical first portion from two or more different MWDs will use the time stamp in an associated second portion to verify only the received UID as a verified UID for the earlier received one thereof.

17. The system of claim 16, wherein the server is further configured to generate a visual query and to receive communications from each MWD over the first wireless channel, and the system further comprising:

a physical display configured to display the visual query; and a database configured to store responses that are received from the MWD associated with verified UIDs and that are associated with the displayed visual query, wherein the server is also configured to perform a statistical analysis on the stored responses, to generate a visual message conveying information regarding the statistical analysis, and to communicate the visual message to the physical display.

18. The system of claim 16, wherein the MWD is also configured to communicate timestamps indicating the time at which the responses are communicated over the first wireless channel.

19. The system of claim 16, wherein each unique identifier comprises a respective fixed location associated with a venue of the event.

20. The system of claim 19, wherein each respective fixed location comprises a defined seat in a closed venue having a seat identifier as the location.

* * * * *